US005852411A

United States Patent [19]
Jacobs et al.

[11] Patent Number: 5,852,411
[45] Date of Patent: Dec. 22, 1998

[54] UNIVERSAL ADAPTOR FOR ELECTRONIC PARKING METERS

[75] Inventors: James P. Jacobs, Phoenixville; Vincent G. Yost, Harleysville, both of Pa.

[73] Assignee: Intelligent Devices, Inc., Harleysville, Pa.

[21] Appl. No.: 731,096

[22] Filed: Oct. 9, 1996

Related U.S. Application Data

[63] Continuation-in-part of Ser. No. 684,368, Jul. 19, 1996.

[51] Int. Cl.[6] .......... B60Q 1/48
[52] U.S. Cl. .......... 340/932.2; 340/933; 194/200
[58] Field of Search .......... 340/932.2, 825.33, 340/825.35, 870.02, 933; 902/26; 235/384; 368/90; 194/900, 217, 200

[56] References Cited

U.S. PATENT DOCUMENTS

| | | | |
|---|---|---|---|
| 3,211,267 | 10/1965 | Bayha | 194/212 |
| 3,588,794 | 6/1971 | Francis | 367/95 |
| 3,774,112 | 11/1973 | Panico | 375/309 |
| 4,129,834 | 12/1978 | Silberberg | 331/91 |
| 4,183,205 | 1/1980 | Kaiser . | |
| 4,249,648 | 2/1981 | Meyer | 194/212 |
| 4,356,903 | 11/1982 | Lemelson et al. | 194/217 |
| 4,460,080 | 7/1984 | Howard | 194/317 |
| 4,483,431 | 11/1984 | Pratt | 194/317 |
| 4,823,928 | 4/1989 | Speas | 194/217 |
| 4,825,425 | 4/1989 | Turner | 368/7 |
| 4,848,556 | 7/1989 | Shah et al. | 194/212 |
| 4,967,895 | 11/1990 | Speas | 194/200 |
| 5,060,777 | 10/1991 | Van Horn et al. | 194/317 |
| 5,062,518 | 11/1991 | Chitty et al. | 194/317 |
| 5,097,934 | 3/1992 | Quinlan, Jr. | 194/200 |
| 5,103,957 | 4/1992 | Ng et al. | 194/217 |
| 5,119,916 | 6/1992 | Carmen et al. | 194/210 |
| 5,153,586 | 10/1992 | Fuller | 340/932.2 |
| 5,259,491 | 11/1993 | Ward, II | 194/350 |
| 5,260,910 | 11/1993 | Panton | 367/99 |
| 5,266,947 | 11/1993 | Fujiwara et al. | 340/932.2 |
| 5,321,241 | 6/1994 | Craine | 463/25 |
| 5,366,404 | 11/1994 | Jones | 453/2 |
| 5,407,049 | 4/1995 | Jacobs | 194/200 |
| 5,442,348 | 8/1995 | Mushell | 340/932.2 |
| 5,454,461 | 10/1995 | Jacobs | 194/200 |
| 5,614,892 | 3/1997 | Ward, II et al. | 340/932.2 |
| 5,648,906 | 7/1997 | Amirpanahi | 364/464.28 |
| 5,659,306 | 8/1997 | Bahar | 340/932.2 |

FOREIGN PATENT DOCUMENTS

| | | | |
|---|---|---|---|
| 2 077 475 | 12/1981 | United Kingdom | G07F 17/24 |

*Primary Examiner*—Jeffery Hofsass
*Assistant Examiner*—Sihong Huang
*Attorney, Agent, or Firm*—Caesar, Rivise, Bernstein, Cohen & Pokotilow, Ltd.

[57] ABSTRACT

A universal adaptor for use with electronic parking meters which provides these electronic parking meters with the ability to detect the presence of a parked vehicle and to adjust the position of the detector for accomplishing the vehicle detection, to gather statistics on the parking spaces and the meters, to alert the parking authority of meters that are expired in connection with vehicles still parked, and zeroing the remaining time off of any meter once the parked vehicle departs.

100 Claims, 20 Drawing Sheets

FIG. 3
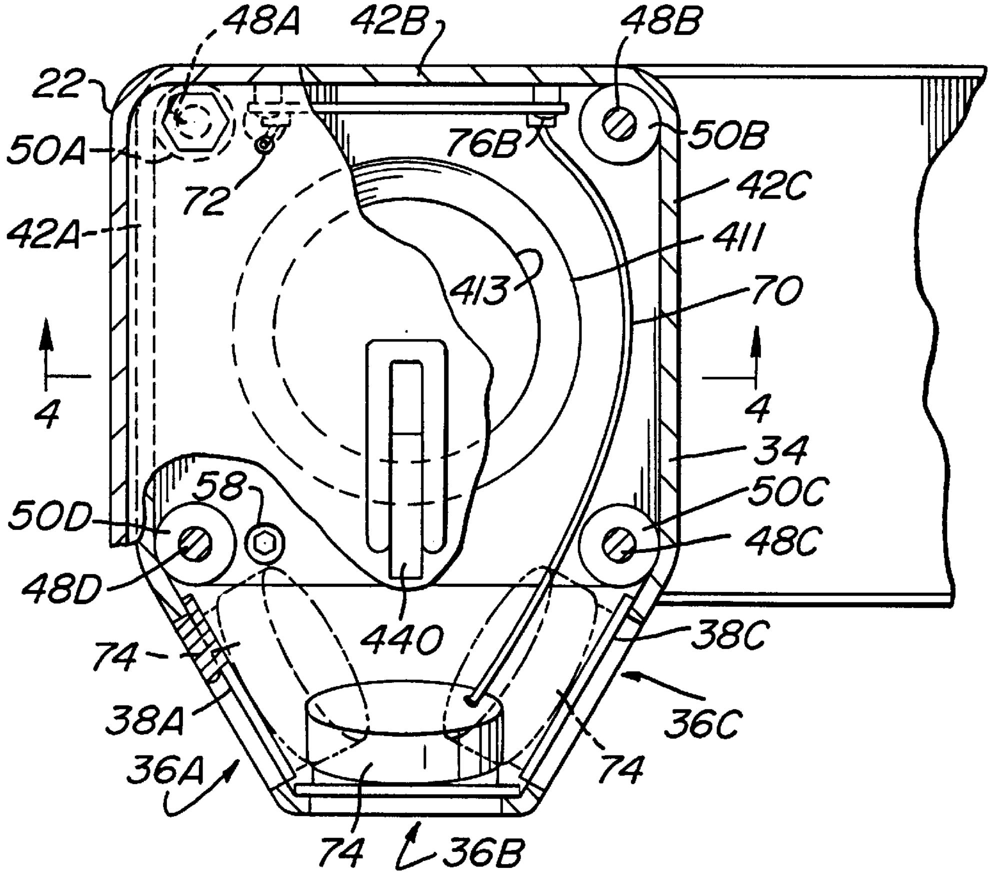
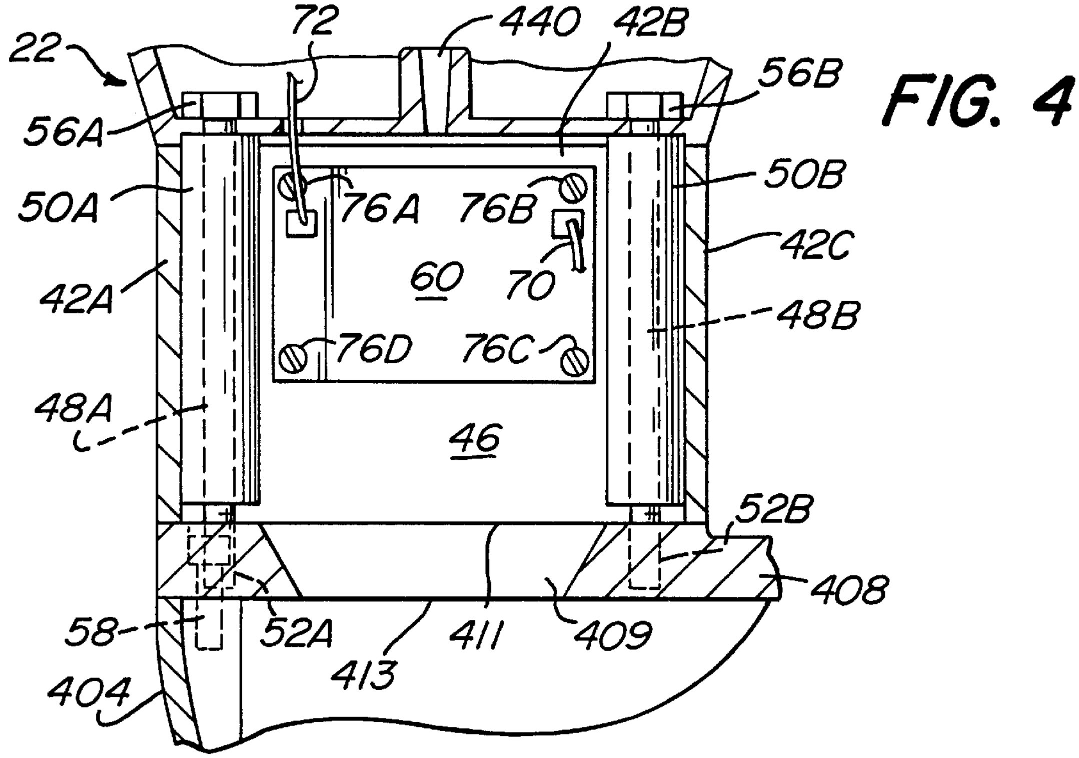
FIG. 4

FIG. 11
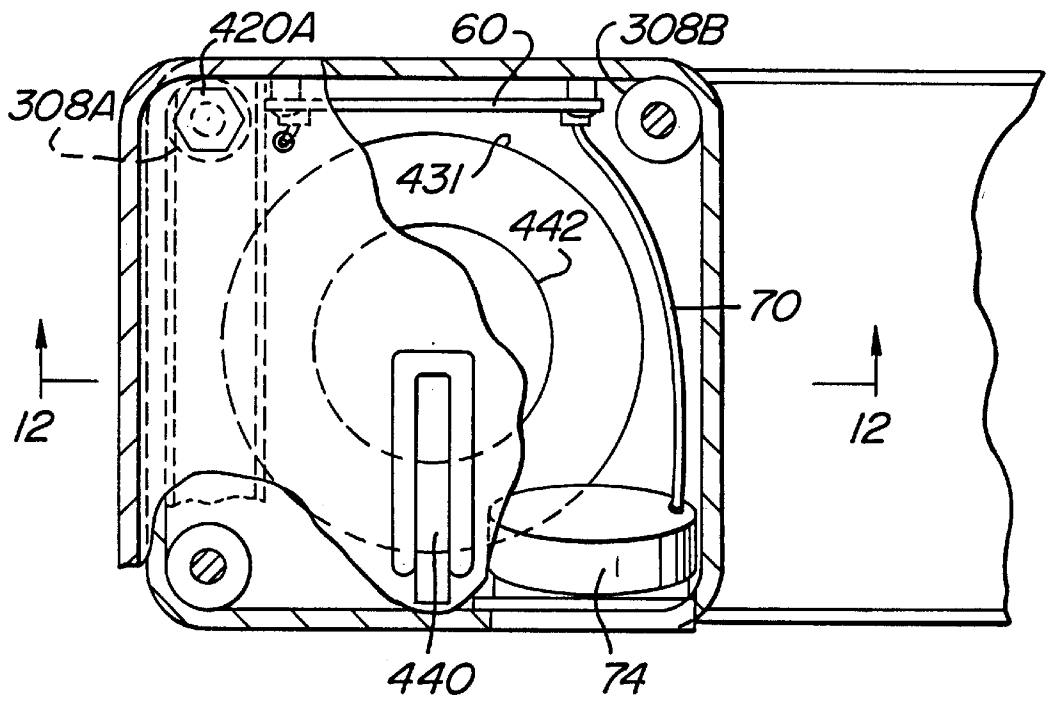
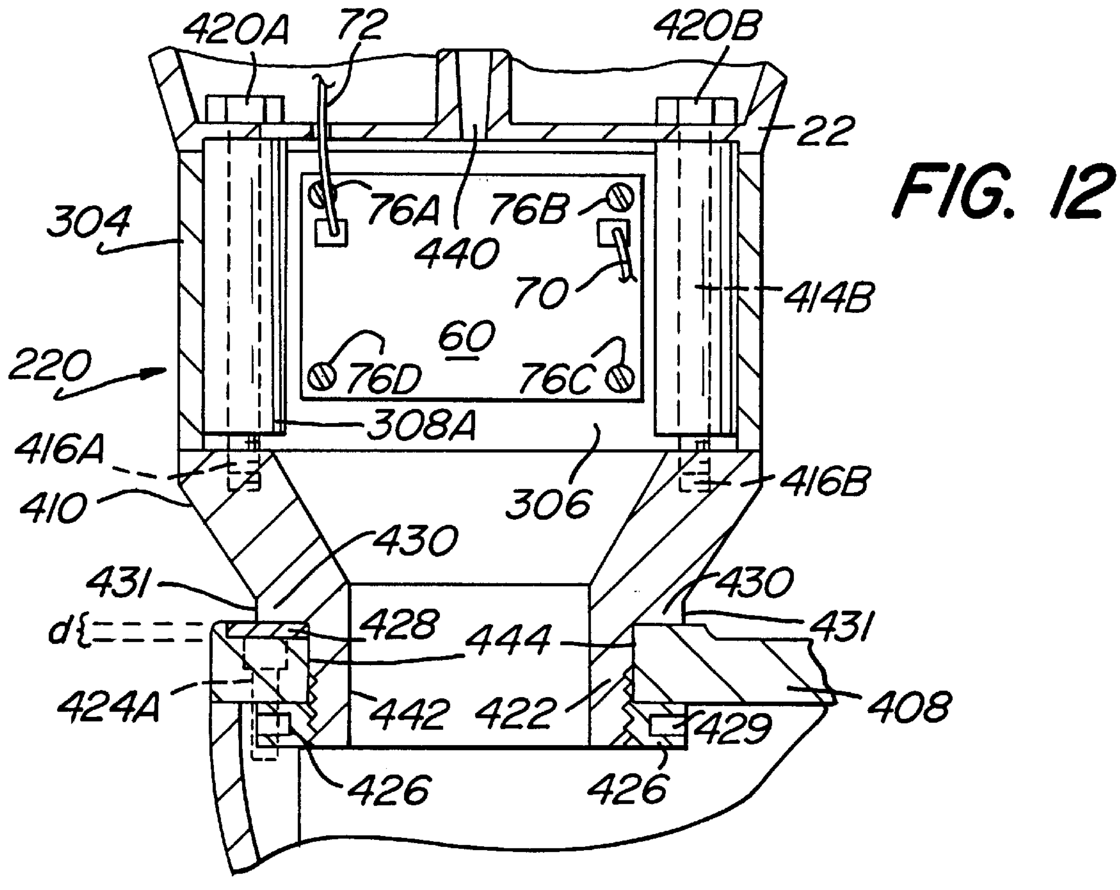
FIG. 12

FIG. 13
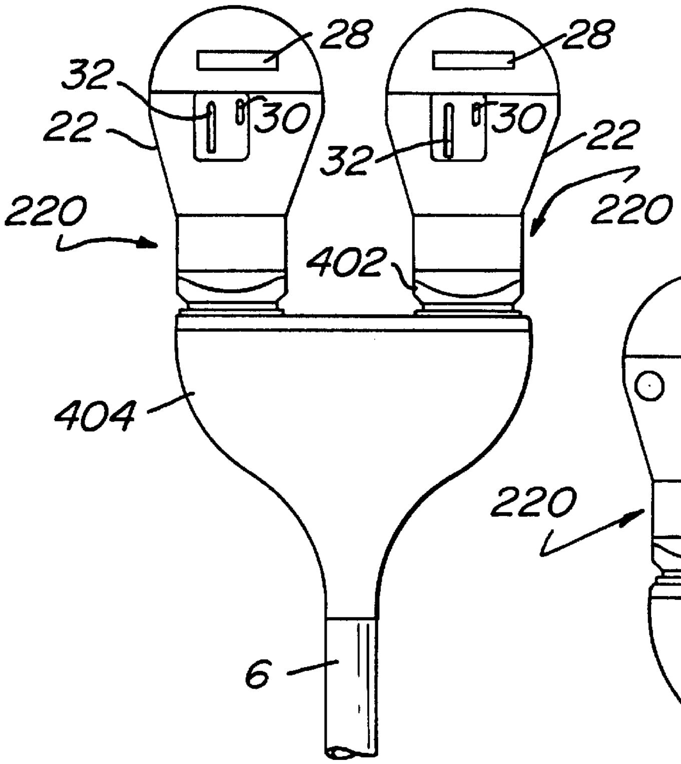
FIG. 14
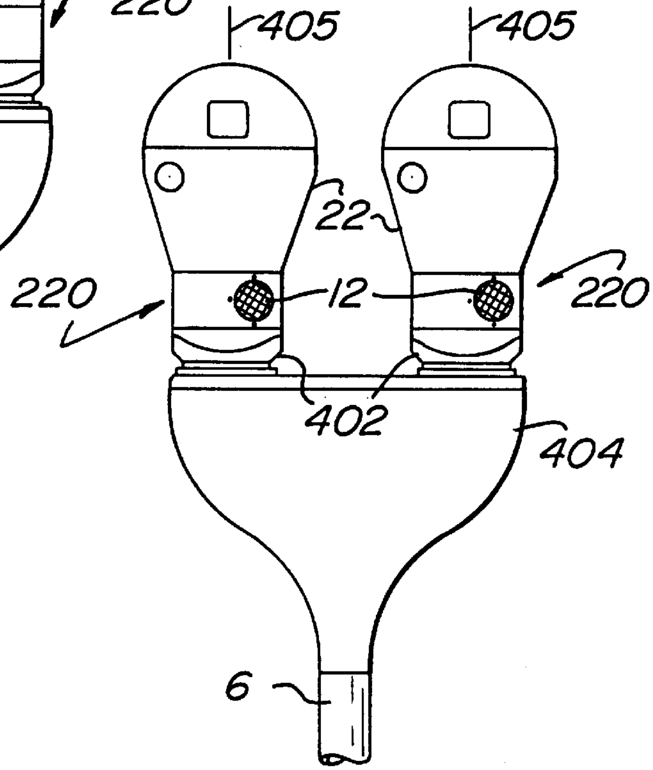
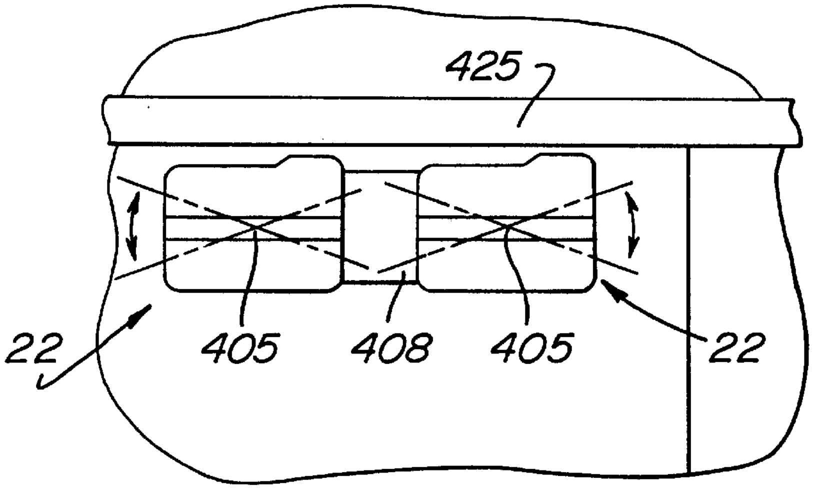
FIG. 15

ONE CX ACROSS EACH IC

| | CURRENT DRAW | | | | | |
|---|---|---|---|---|---|---|
| | PEAK CURRENT | | | AVERAGE CURRENT | | |
| | 4 VOLT | 6 VOLT | TIME CN | 4 VOLT | 5 VOLT | 6 VOLT |
| AWAKE: TRANSMIT | 0.5A | 0.5A | 80 µS | 40 µA | 40 µA | 40 µA |
| NO TRANSMIT | 8.0mA | 8.0mA | 100mS | 800 µA | 800 µA | 800 µA |
| ASLEEP | 500 µA | 500 µA | 900 mS | 450 µA | 450 µA | 450 µA |
| | TOTAL AVERAGE CURRENT | | | | | 1290 µA |

UNIVERSAL ADAPTOR FOR ELECTRONIC PARKING METERS

RELATED APPLICATIONS

This invention is a continuation-in-part of U.S. application Ser. No. 08/684,368, filed on Jul. 19, 1996 whose disclosure is incorporated by reference herein.

FIELD OF THE INVENTION

This invention relates generally to the field of parking meters and more particularly to electronic parking meters.

BACKGROUND OF THE INVENTION

Parking meters permit vehicles to be parked on streets for an allowable time determined by the number and denominations of coins which are placed in the parking meter. A clock mechanism in the parking meter runs down the allowable time until it reaches zero, and an overtime parking indication appears.

The coin receiving devices of the parking meters perform various tests to determine whether an acceptable coin has been inserted, and the denomination of the coin. Circuitry which tests for the presence of the ferrous material (i.e., slugs) includes Hall-effect sensors, and frequency shift metallic detectors. The denomination is determined by devices which measure the diameter of the coin such as infra-red emitting diodes and photodiodes, or which measure the weight of the coin using strain gauges, and the like.

Coin receiving mechanisms which use IR detectors, Hall-effect circuitry, magnetic fields and light sensing rays with microprocessors include U.S. Pat. No. 4,460,080 (Howard); U.S. Pat. No. 4,483,431 (Pratt); U.S. Pat. No. 4,249,648 (Meyer); U.S. Pat. No. 5,097,934 (Quinlan Jr.); U.S. Pat. No. 5,119,916 (Carmen et al.).

In recent years, electronic parking meters and systems have been developed which use microprocessors in conjunction with electronic displays, IR transceivers to communicate with auditors, and ultrasonic transceivers to determine the presence of vehicles at the parking meter. U.S. Pat. No. 4,967,895 (Speas) and U.S. Pat. No. 4,823,928 (Speas) disclose electronic parking meters which use microprocessors, electronic displays, IR transceivers, solar power and sonar range finders. In addition, British Publication No. 2077475 also discloses a low power electronic parking meter that operates using solar cells.

The sophisticated devices which use microprocessors, electronic displays and IR/ultrasonic transducers consume too much power to operate by non-rechargeable batteries alone. Thus, the Speas' patents disclose the use of solar power cells which charge capacitors or rechargeable batteries.

Various problems exist with the use of solar power sources including the use of parking meters in shady areas, or the use of parking meters during periods in which there is very little sunlight. This causes the rechargeable batteries to run down, and they require frequent replacement. Or, in the case of the use of capacitors, the lack of power causes the meter to become inoperative.

Low power coin sorters are disclosed in U.S. Pat. No. 4,848,556 (Shah et al.); U.S. Pat. No. 5,060,777 (Van Horn et al.).

Coin processing and related auditing data systems are shown in U.S. Pat. No. 5,259,491 (Ward II); U.S. Pat. No. 5,321,241 (Craine); U.S. Pat. No. 5,366,404 (Jones);

Other token/coin processing devices such as disclosed in U.S. Pat. No. 3,211,267 (Bayha) provides token validation using magnetics; U.S. Pat. No. 3,998,309 (Mandas et al.) discloses an apparatus to prevent coin stringing and U.S. Pat. No. 5,062,518 (Chitty et al.) discloses apparatus that detects coin denomination based on acoustic vibrations from the coins striking an internal surface.

Parking devices using wireless data transmission are disclosed in U.S. Pat. No. 4,356,903 (Lemelson et al.); U.S. Pat. No. 5,103,957 (Ng et al.); U.S. Pat. No. 5,153,586 (Fuller); U.S. Pat. No. 5,266,947 (Fujiwara et al.).

Furthermore, the electronic parking meters are not necessarily intelligent meters. That is, these meters use electronics but they do not respond to changing conditions. For example, none of the above devices resets the parking meter to an expired state should the vehicle leave before the allotted time has passed; instead, the parking meter provides "free" parking for the time remaining.

In U.S. Pat. No. 5,407,049 (Jacobs), U.S. Pat. No. 5,454,461 (Jacobs), and application Ser. No. 08/300,253 all of which are assigned to the same Assignee of the present invention and all of whose disclosures are incorporated by reference herein, there is disclosed a low-powered electronic parking meter that utilizes, among other things, a sonar transducer to detect the presence of vehicles, an infra-red transceiver for communicating with parking authority personnel, and domestic coin detection, coin jam detection and slug detection.

However, not all electronic parking meters that utilize some type of microprocessor, microcontroller or other digital processing have the capability of detecting the presence of vehicles.

Therefore, there remains a need for an easily-attachable and secure accessory unit to any electronic parking meter in order to provide that electronic parking meter with the ability to detect the presence of vehicles without the need to substantially modify the hardware of the electronic parking meter.

OBJECTS OF THE INVENTION

Accordingly, it is the general object of this invention to provide an apparatus which addresses the aforementioned needs.

It is a further object of this invention to provide an adaptor that can be used with any electronic parking meter so that the electronic parking meter can be coupled to the vault of a parking meter.

It is yet another object of this invention to provide an adaptor that provides any electronic parking meter with the ability to detect the presence or absence of vehicles in the corresponding parking space.

It is still another object of this invention to provide an adaptor that can be properly aimed to detect the presence or absence of vehicles in the corresponding parking space.

It is yet a further object of this invention to provide an adaptor that can be properly aimed to detect the presence or absence of vehicles in the corresponding parking space without the need to rotate the electronic parking meter itself.

It is another object of this invention to provide an adaptor that provides any electronic parking meter with the ability to detect the presence or absence of vehicles in the corresponding parking space without the need to substantially modify the hardware of the electronic parking meter.

It is a further object of this invention to provide an adaptor that provides any electronic parking meter with the ability to gather statistics on the parking space.

It is a further object of this invention to provide an adaptor that provides any electronic parking meter with the ability to communicate, by radio, parking information from the electronic parking meter to a remote location.

It is a further object of this invention to provide an adaptor that provides any electronic parking meter with the ability to alert parking authority personnel when the electronic parking meter is expired with vehicles parked in the corresponding parking space.

It is a further object of this invention to provide an adaptor that provides any electronic parking meter with the ability to zero the remaining time off the parking meter when the vehicle departs.

SUMMARY OF THE INVENTION

These and other objects of the instant invention are achieved by providing an adaptor for coupling an electronic parking meter to a vault on a stanchion at a corresponding curb side parking space, or at a parking lot space, whereby the adaptor comprises an enclosure disposed between the vault and the electronic parking meter. The enclosure itself comprises a closed wall which defines an internal passageway for permitting coins to drop through, from the electronic parking meter to the vault. The adaptor also includes a vehicle detector, inside the enclosure, for detecting the presence of a vehicle in the corresponding curb side parking space or parking lot space and whereby the vehicle detector is in electrical communication with the electronic parking meter. Furthermore, the adaptor includes securement means which comprise a plurality of sleeves adapted to receive respective bolts for securing the electronic parking meter and the adaptor to the vault by parking authority personnel only.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 3 is a view of the present invention taken along the lines 3—3 of FIG. 2;

FIG. 4 is a view of the present invention taken along lines 4—4 of FIG. 3;

FIG. 11 is a view of the third embodiment taken along lines 11—11 of FIG. 10;

FIG. 12 is a view of the third embodiment taken along lines 12—12 of FIG. 11;

FIG. 13 is a patron-side view of two electronic parking meters coupled to respective third embodiments of the present invention installed on a double-headed meter platform;

FIG. 14 is a vehicle-side view of FIG. 13;

FIG. 15 is a top view of the double-headed meter depicting the rotation angle permitted by the rotator adaptor;

DESCRIPTION OF THE PREFERRED EMBODIMENT OF THE INVENTION

Figure 1:
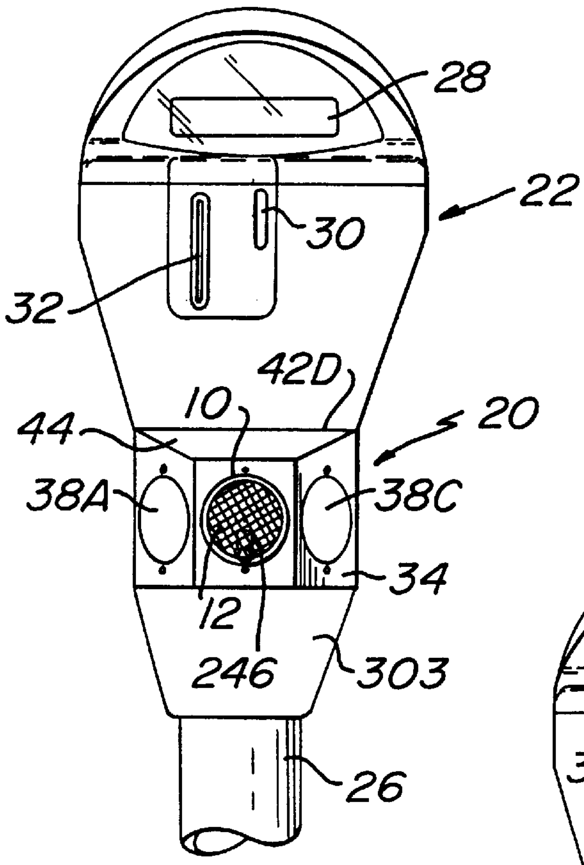
FIG. 1 is a vehicle-side view of the present invention.
Figure 2:
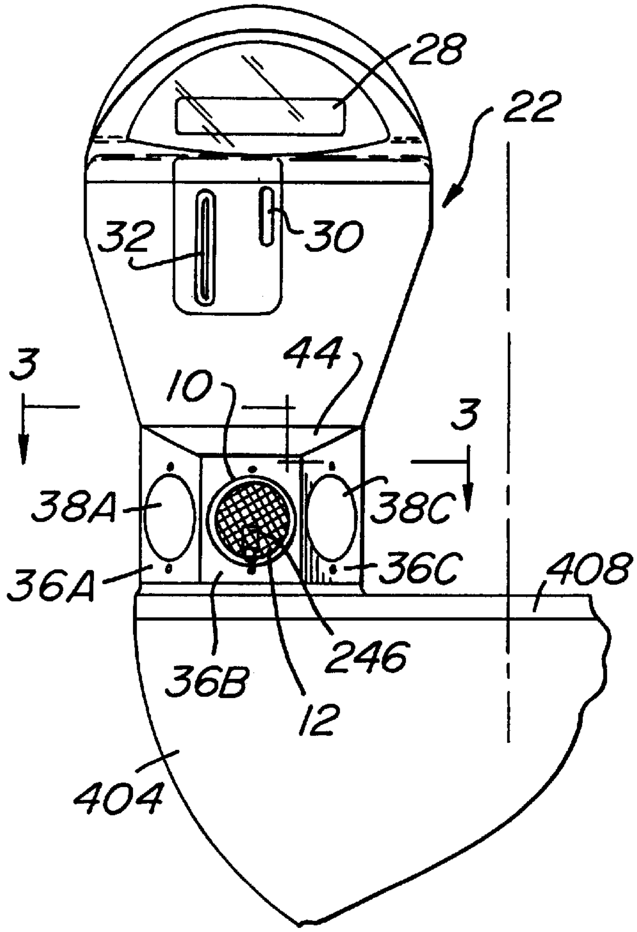
FIG. 2 is a vehicle-side view of the present invention installed on a double-headed meter platform.

Referring now in greater detail to the various figures of the drawing wherein like reference characters refer to like parts, a universal adaptor for electronic parking meters constructed in accordance with the present invention is shown generally at 20 in FIG. 1.

An electronic parking meter 22 is shown coupled to the universal adaptor 20. The adaptor 20 connects the electronic parking meter 22 to a coin vault 303 that is mounted on a stanchion 26.

It should be understood that the electronic parking meter 22 shown represents any parking meter that utilizes a microprocessor, microcontroller or any other similar digital processing device. Typically, such electronic parking meters comprise an electronic display 28 for displaying parking time/amount information to the patron or parking meter personnel. A coin slot 30 is shown on the housing of the electronic parking meter 22; a debit card slot 32 may also be available with the electronic parking meter 22 for permitting the payment of parking time with a debit card rather than with coins. One example of such an electronic parking meter is disclosed in application Ser. No. 08/684,368 whose disclosure is incorporated by reference herein and assigned to the same Assignee, namely Intelligent Devices, Inc., as the present invention.

The universal adaptor 20 comprises a housing 34 that forms an enclosure having three "facet" surfaces, 36A, 36B, 36C, that serve to support the transducer assembly 74 (sonar transducer, Polaroid electrostatic transducer Model #7000 or equivalent), disclosed in application Ser. No. 08/684,368, for detecting the presence of a vehicle, as shown most clearly in FIG. 3. These surfaces 36A, 36B and 36C are angled to provide the parking authority with one of three orientations to mount the transducer 74. As such, only one of the three facet surfaces is used at a time with an electronic parking meter 22. For example, if the electronic parking meter 22 is to be used for detecting cars head-on, the adaptor

20 is used with the transducer 74 mounted in an opening 10 in facet surface 36B (FIG. 1). If a double headed-meter platform (i.e., two electronic meters 22 are situated on a single platform, FIG. 14, for detecting two cars parked one behind the other) is used, then one electronic meter 22 utilizes an adaptor 20 having the transducer 74 mounted in facet surface 36A for detecting the front end of one vehicle (not shown) while the other electronic parking meter 22 utilizes an adaptor 20 having the transducer 74 mounted in facet surface 36C for detecting the back end of the forward vehicle. It should be noted that with any adaptor 20, the unused facet surfaces are closed-off by a cover 38A or 38C (FIG. 3; the cover for the facet surface 36B is not shown) and removably secured to the housing 34 from within the adaptor 20. The advantage of the adaptor 20 is that the facet surfaces 36A, 36B, and 36C provide the parking authority with a choice of orientations for positioning the transducer 74 for properly detecting parked vehicles without the need to orient the entire electronic parking meter 22 at the parking space.

It should be noted that the opening 10 in the facet surface 36B is covered with a protective mesh 12 and that the transducer 74 is mounted behind the protective mesh 12. In addition, a phototransistor 246 is mounted just behind the mesh 12 for monitoring the brightness level adjacent the meter 22, as discussed in application Ser. No. 08/684,368 and will not be repeated here.

As shown more clearly in FIG. 3, the enclosure formed by the housing 34 comprises three sidewalls 42A, 42B and 42C and the faceted surfaces 36A, 36B and 36C. When the electronic parking meter 22 is coupled to the adaptor 20 the three sidewalls 42A, 42B and 42C conform to the bottom edges of the electronic parking meter 22 to provide a secure enclosure. As such, the walls 42A–42C conform to the shape of the bottom of the electronic parking meter 22. A facet surface 44 forms a top cover between the electronic parking meter 22 and the top edges of the facet surfaces 36A, 36B and 36C. The interior 46 (FIG. 4) is substantially empty permitting an unobstructed path for coins processed by the electronic parking meter 22 to pass through a coin housing slot 440 (in the electronic parking meter 22), through the adaptor 20 and then into the vault 303 or 404.

The adaptor 20 is secured to the vault 303 or 404 via four bolts 48A–48D (FIG. 3). Each of the bolts 48A–48D is disposed in a respective bolt sleeve 50A–50D in the adaptor 20 as well as in threaded sleeves, only two 52A and 52B of which are shown, in the cover plate 408 of the vault 404. The bolts 48A–48D secure the parking meter 22 and the adaptor 20 to the vault 404. As can also be seen in FIG. 4, the bolt heads, only two (56A and 56B) of which are shown, are contained in the parking meter 22, thereby preventing any tampering from outside the meter 22. A bolt 58 for securing the top plate 408 to the vault 404 is shown in phantom in FIG. 4. The opening 409 in the top plate 408 is tapered, i.e., an upper circumferential edge 411 has a larger diameter than a lower circumferential edge 413, to direct the passage of the processed coin into the vault 404.

It should be noted that although no cover plate is depicted for the single vault 303, coupling the adaptor 20 to the single vault 303 is readily apparent to one skilled in the art, e.g., bolts 48A–48D would be received by threaded sleeves in the sidewalls of the single vault 303.

As shown in FIGS. 3–4, a printed circuit board (PCB) 60 is mounted on the inner surface of the sidewall 42B in the housing 34. As will be discussed in detail later, the PCB 60 contains the electronic circuitry that interfaces the transducer assembly 74 with the electronic parking meter's 22 own electronics (not shown) In particular, the electronics on the PCB 60 comprise an auto detector 62, a processor 64 and an RF transceiver 66. The transducer assembly 74 is electrically coupled to the PCB 60 via a wire harness 70. The electronic parking meter 22 is electrically coupled to the PCB 60 via a wire harness 72. The PCB 60 is secured to the sidewall 42B via four screws 76A–76D.

A second embodiment 120 of the adaptor is shown in FIGS. 5–8. The adaptor 120 is an adjustable universal adaptor. To that end, the adaptor 120 can be rotated about a vertical axis to permit the parking authority the ability to position the transducer 74 in a particular orientation for proper detection of parked vehicles, rather than in only one of three orientations as discussed for the first embodiment 20.

Figure 7:
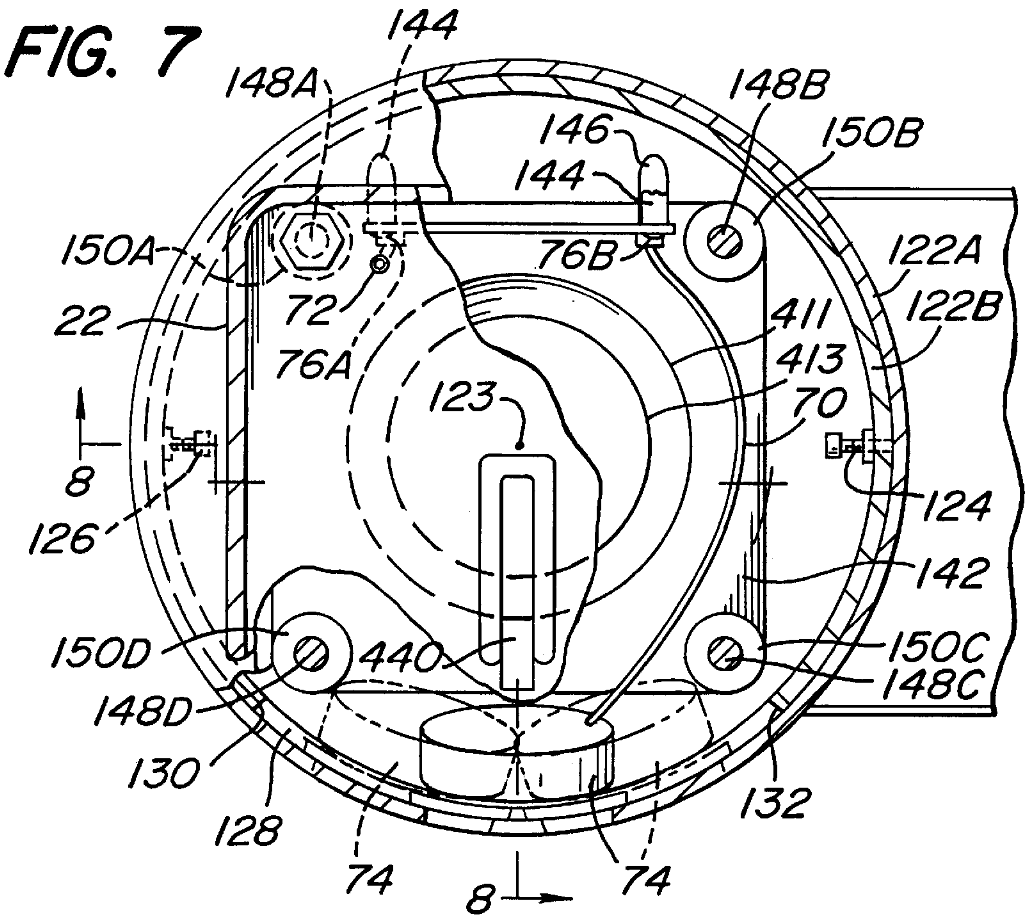
FIG. 7 is a view of the second embodiment taken along lines 7—7 of FIG. 6.
Figure 8:
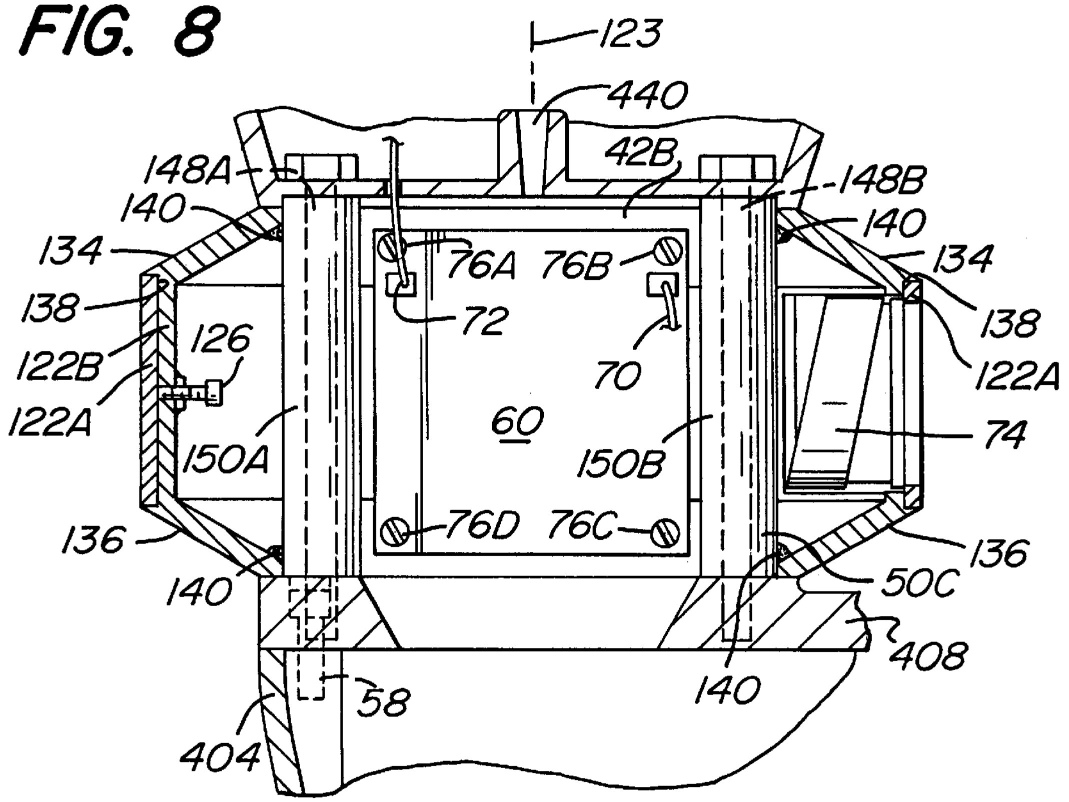
FIG. 8 is a view of the second embodiment taken along lines 8—8 of FIG. 7.
Figure 9:
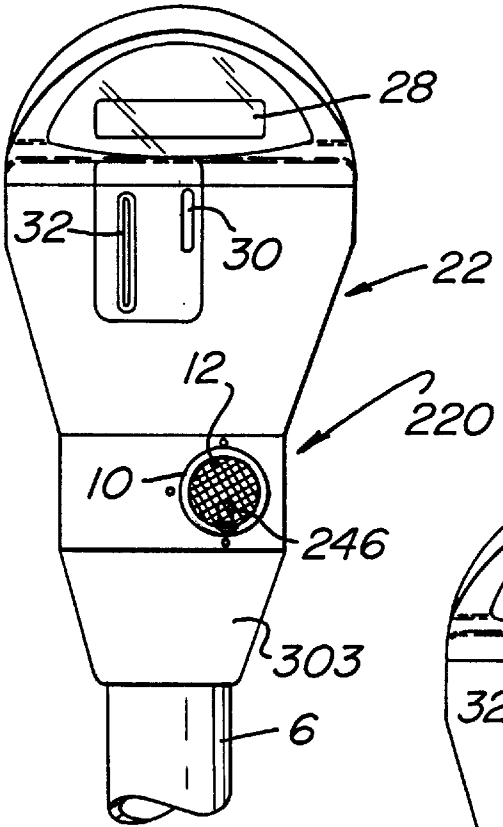
FIG. 9 is a vehicle-side view of a third embodiment of the present invention.
Figure 10:
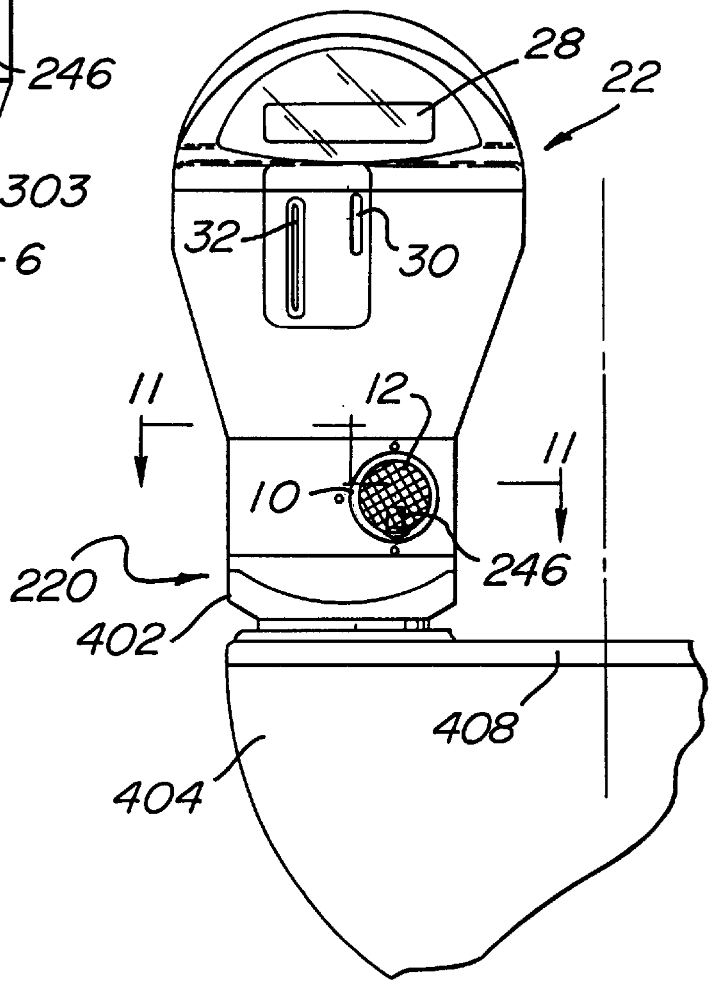
FIG. 10 is a vehicle-side view of third embodiment installed on a double-headed meter platform using a rotator adaptor.

As shown most clearly in FIG. 7, the adaptor 120 comprises two concentric rings 122A and 122B that are releasably secured using internal adjustment screws 124 and 126. The inner ring 122B is stationary while the outer ring 122A is rotatable. The transducer assembly 74 is secured to the outer ring 122A so that when the outer ring 122A is moved, the transducer 74 moves with it. A slot 128 in the inner ring 122B permits the transducer 74 to be rotated to any particular angular orientation, with respect to a vertical axis 123, between two stops 130 and 132 and then locked. For example, the slot 128 may permit approximately 150° of arc movement of the transducer assembly 74.

Figure 5:
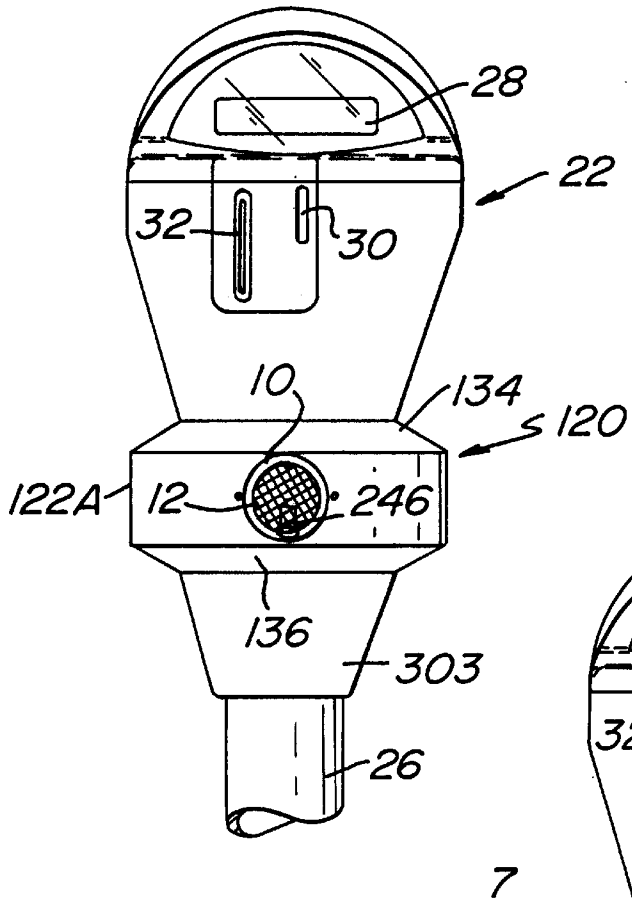
FIG. 5 is a vehicle-side view of a second embodiment of the present invention.
Figure 6:
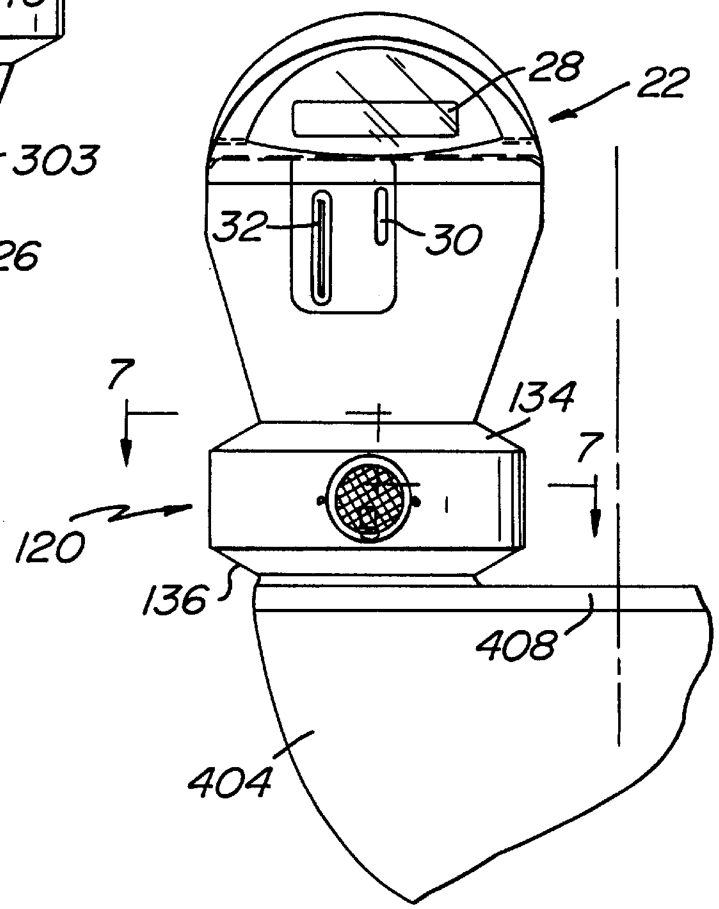
FIG. 6 is a vehicle-side view of the second embodiment installed on a double-headed meter platform.

As shown in FIGS. 5–6, the adaptor 120 forms an enclosure having an upper tapered surface 134, the outer ring 122A and a lower tapered surface 136. As shown more clearly in FIG. 8, the upper surface 134 is tapered downward to be contiguous with the inner ring 122B while the lower surface 136 is tapered upward to be contiguous with the inner ring 122B. The outer ring 122A slides inside a recess 138 formed by the upper tapered surface 134, the inner ring 122B and the lower tapered surface 136. The tapered surfaces 134 and 136 are secured (e.g., welded as indicated by welds 140) to interior bolt sleeves 150A–150D, which are similar in function and construction to bolt sleeves 50A–50D of the first embodiment 20. These bolt sleeves 150A–150D receive respective bolts 148A–148D that operate similarly to the bolts 48A–48D discussed previously with the first embodiment 20. Thus, the adaptor 120 comprises a rectangular-shaped opening 142 at the bottom and the top (not shown) of the adaptor 120, thereby permitting the electronic parking meter 22 to be coupled to the vault 404, as discussed previously with the first embodiment 20.

The PCB 60 is coupled to the tapered surfaces 134 and 136. In particular, as shown in FIG. 7, the screws 76A and 76B are received into respective threaded receptacles 144 in the upper surface 134. The screws 76C and 76D are received into respective threaded receptacles 146 in the lower surface 136.

As with the first embodiment 20, it should be noted that although no cover plate is depicted for the single vault 303, coupling the adaptor 120 to the single vault 303 is readily apparent to one skilled in the art, e.g., bolts 148A–148D would be received by threaded sleeves in the sidewalls of the single vault 303.

A third embodiment 220 of the adaptor is shown in FIGS. 9–12. The third embodiment 220 of the adaptor is similar to the sensor spacer 302 of application Ser. No. 08/684,368. The only difference is that the PCB 60 is coupled to the inner surface of one wall of the adaptor 220 and the conductors 70 and 72 couple the transducer 74 and the electronic parking meter 22 to the PCB 60 accordingly. In all other respects, the adaptor 220 is similar to the sensor spacer 302 of application Ser. No. 08/684,368. As with the sensor spacer 302, the adaptor 220 can be used with the rotator adaptor 402 of application Ser. No. 08/684,368. As such, the detail of the adaptor 220 is not repeated here.

FIGS. 13–15 depict the double-headed meter platform 404 with electronic parking meters 22 coupled thereto using the universal adaptors 220 along with respective rotator adaptors 402. It should be noted that in FIGS. 13–14 the transducer assembly 74 is positioned on the opposite side of the electronic parking meter 22 having the coin slot 30/debit card slot 32. Such a configuration would be used for street-side parking wherein the coin slot 30/card slot 32 (FIG. 13) of the meters 22 would face the sidewalk and the transducer assembly 74 (FIG. 14) of the adaptor 220 would face the parked car being detected.

Furthermore, each parking meter 22/adaptor 220 assembly would not be facing in the same direction as shown in FIG. 14; instead, each meter 22/adaptor 220 would be rotated about its vertical axis 405 to an optimum position so that one meter 22/adaptor 220 assembly would detect one parked car and the other meter 22/adaptor 220 would detect the parked car in front of the other parked car. FIG. 15 is a top view of the double-headed meter platform 404 with meters 22 showing how the meters 22 can be rotated about their respective axes 405.

Because the universal adaptors 20, 120 and 220 can be used with any electronic parking meter 22, the adaptors provide any electronic parking meter 22 coupled thereto, with the capability to detect the presence of a vehicle, gather statistics on the parking space and alerting the parking authority personnel of meters that have expired with vehicles parked at them and to command the electronic parking meters 22 to zero the remaining time off the meter 22 when the vehicle departs. An RS-232 link is provided between the adaptor's 20 (120 or 220) microprocessor 64 and the electronic parking meter's 22 internal microprocessor. It is over this link that the microprocessor 64 communicates to the electronic parking meter 22 all of the data regarding the detected vehicle, as well as other electronic parking meter 22 data; in addition, this same link permits the electronic parking meter 22 the ability to communicate parking meter data/status (e.g., coins processed, debit card data, jams, etc.) to the universal adaptor microprocessor 64. To accomplish such tasks, the following is a description of the electronic circuitry that reside on the PCB 60 of the universal adaptors 20, 120 and 220.

FIGS. 16–21 are the electrical schematic diagrams for the electronics located on the PCB 60. As stated earlier, the PCB 60 is electrically coupled through a wire harness 70 to the transducer assembly 74 and is electrically coupled to the electronic parking meter 22 through a wire harness 72.

Figure 16:
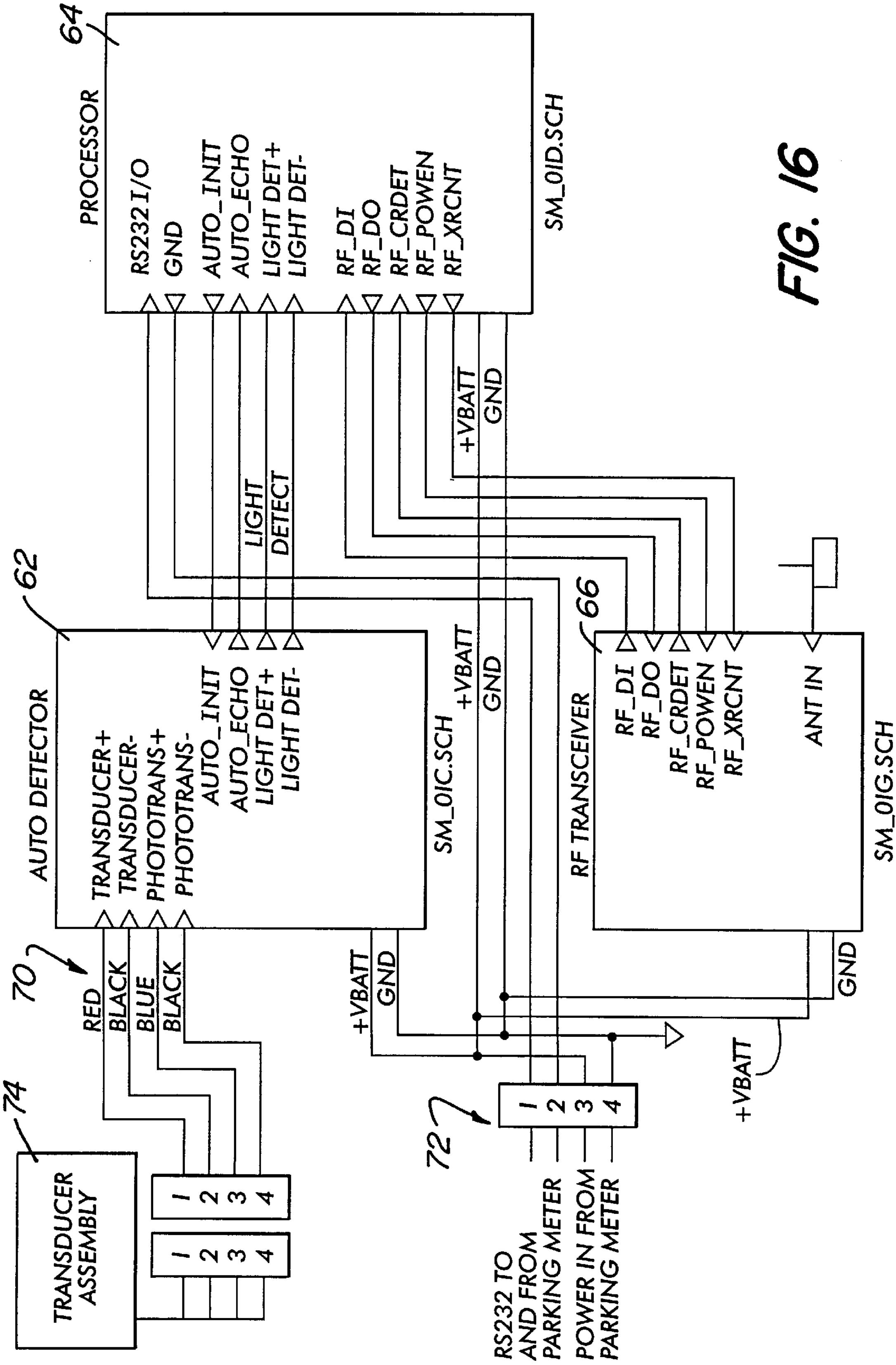
FIG. 16 is a block diagram of the electronics of the present invention.
Figure 18A:
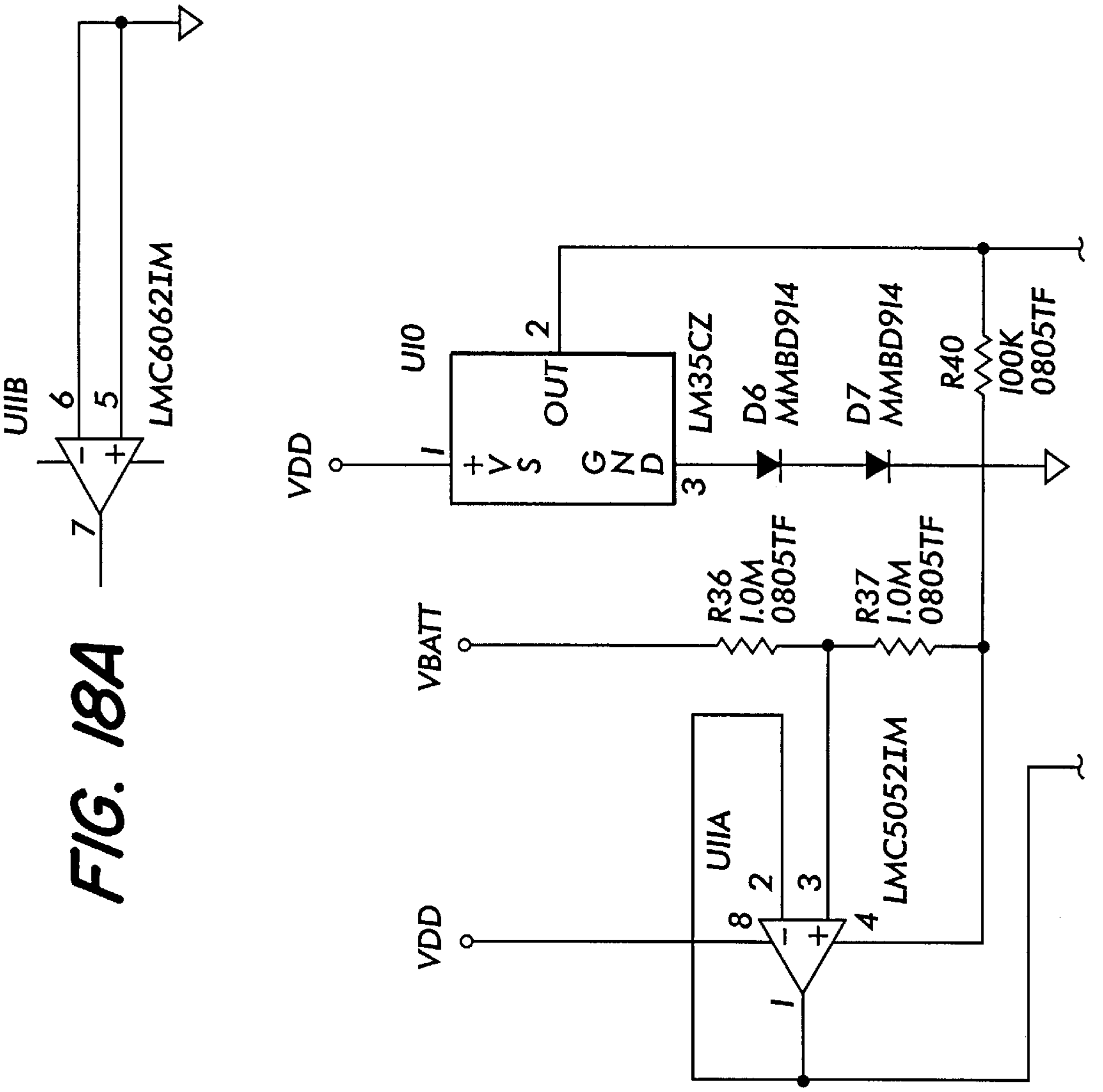
FIGS. 18A–18E constitute an electrical schematic of the microprocessor.
Figure 17:
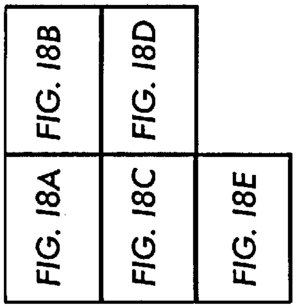
FIG. 17 is a figure layout for FIGS. 18A–18E.
Figure 18B:
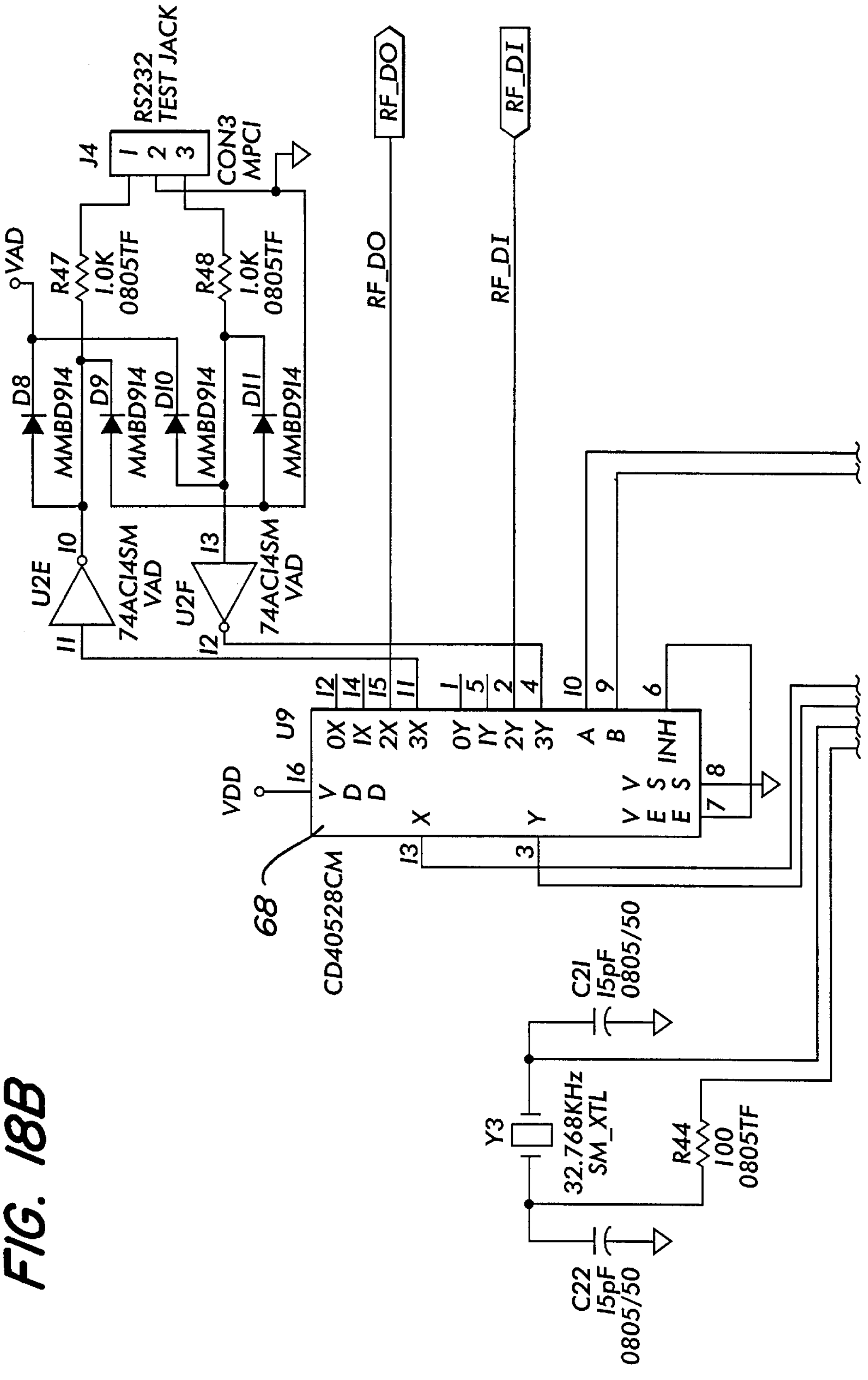
Figure 18C:
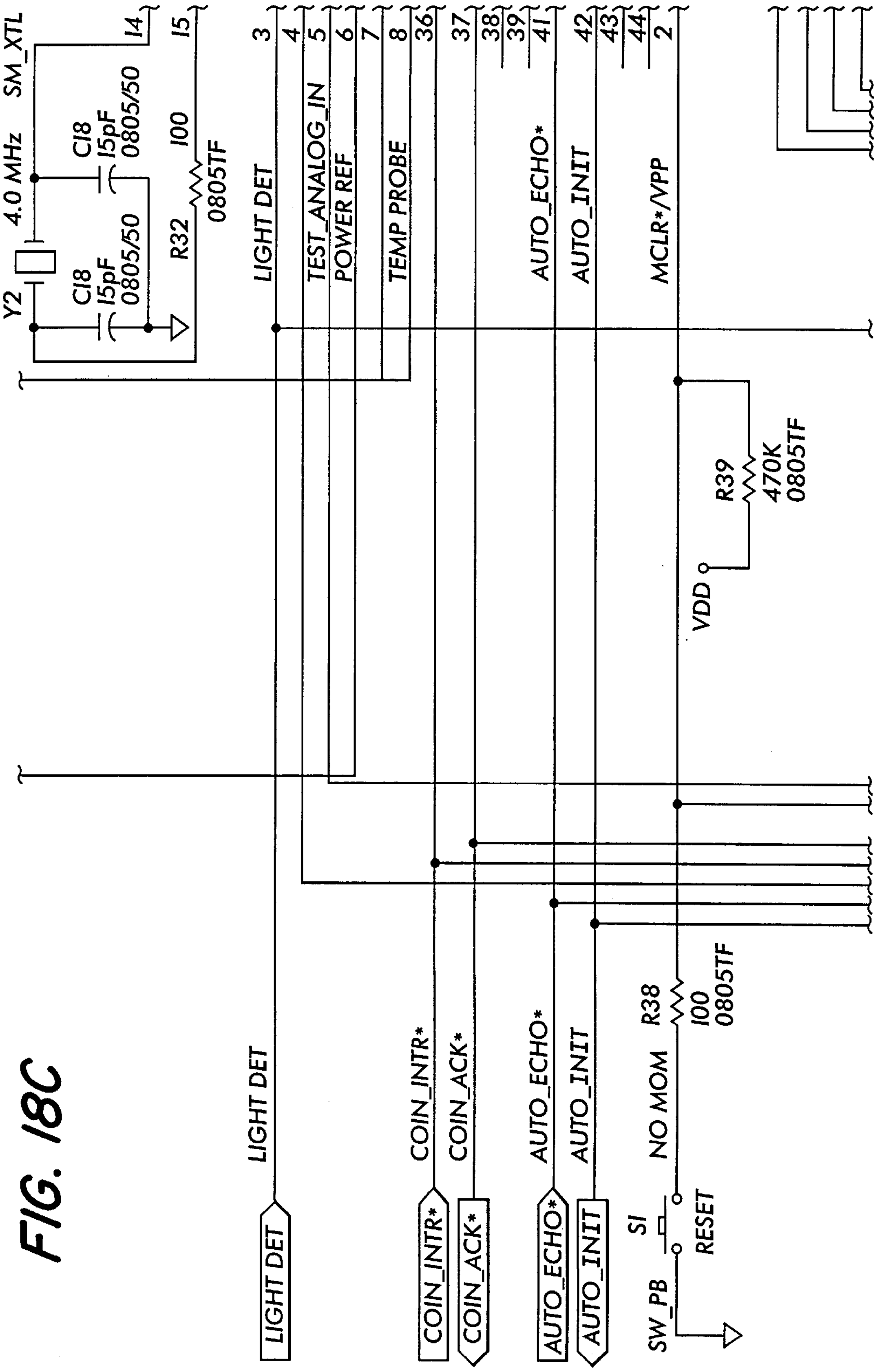
Figure 18D:
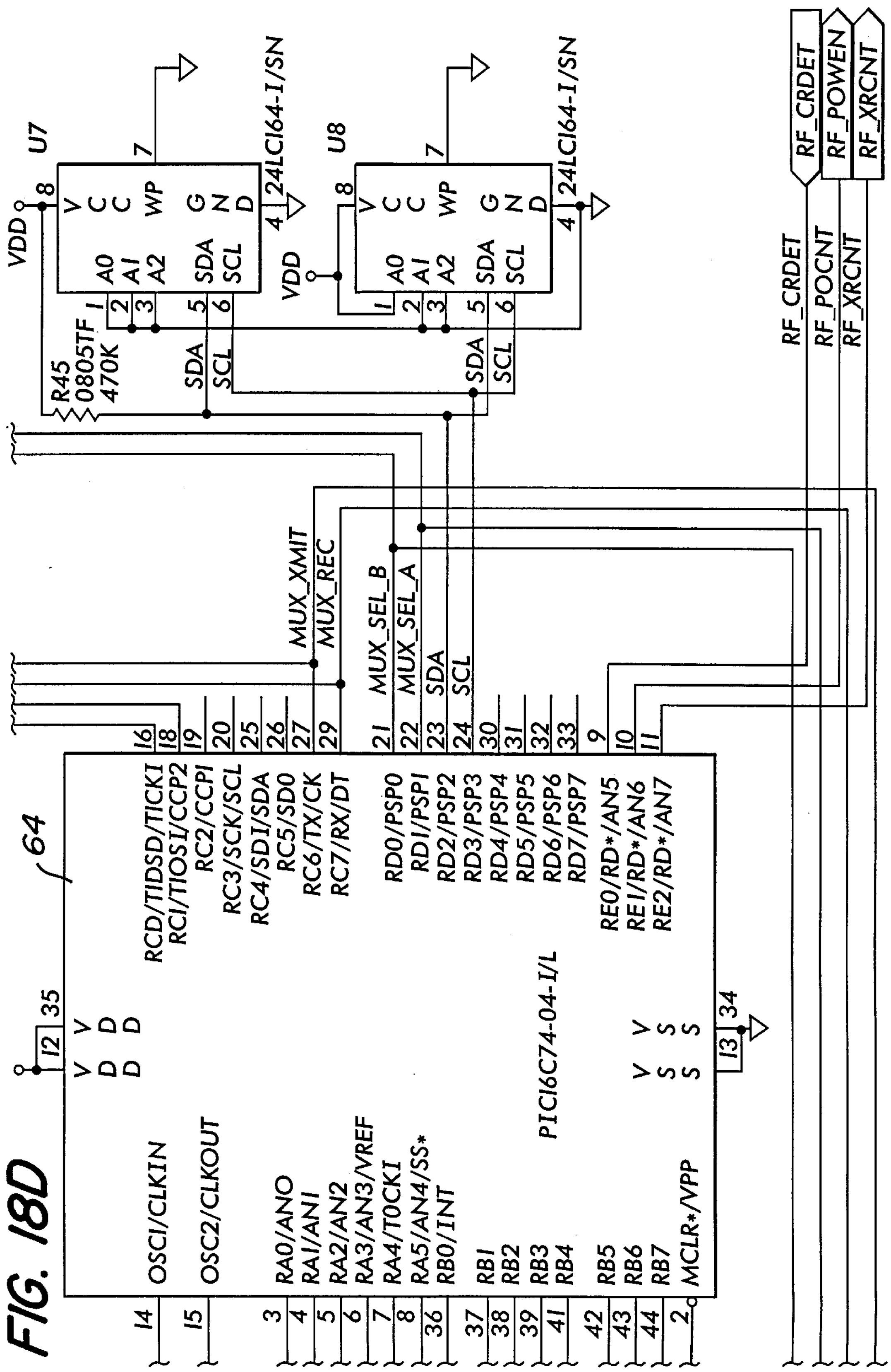
Figure 18E:
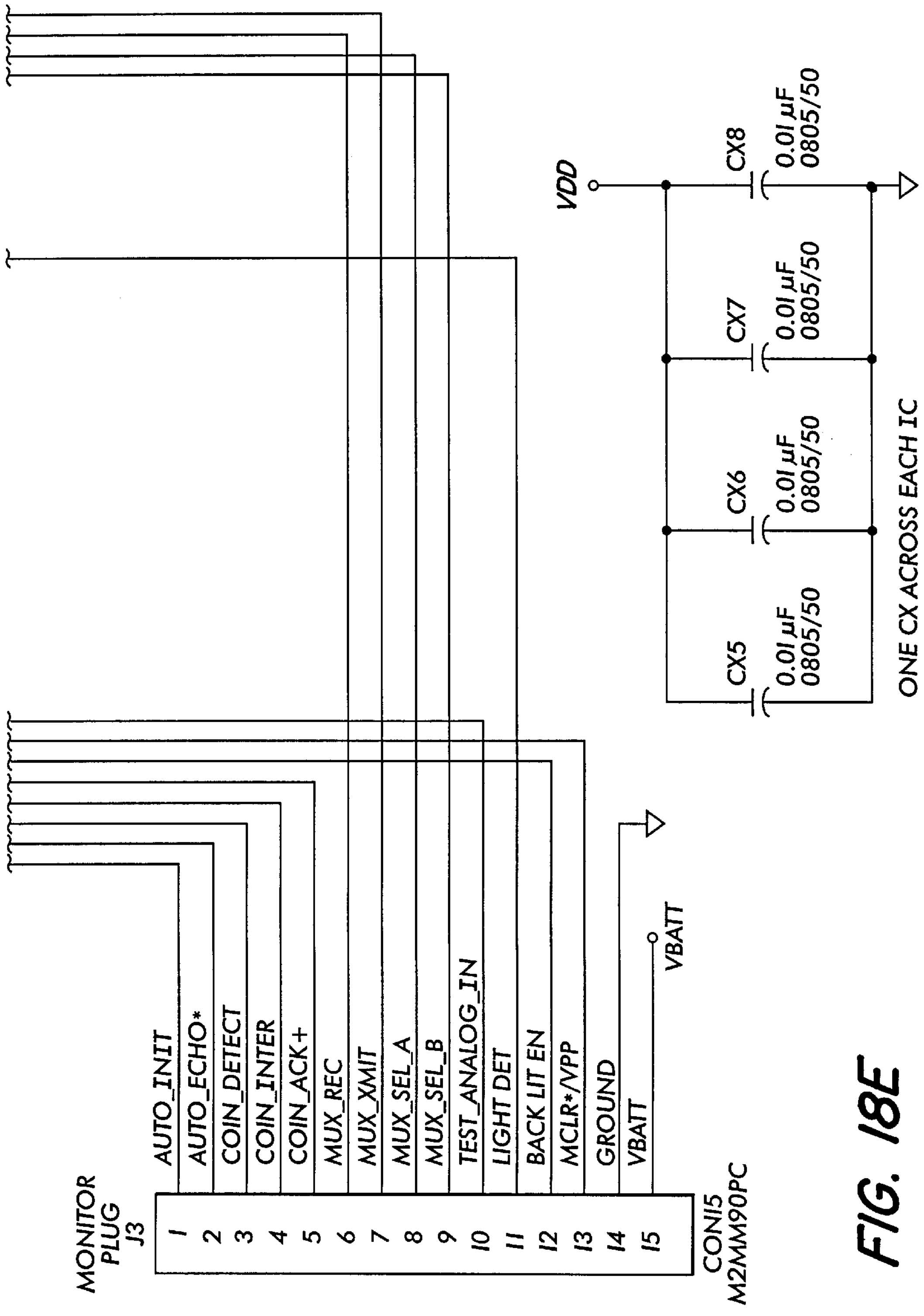
Figure 20A:
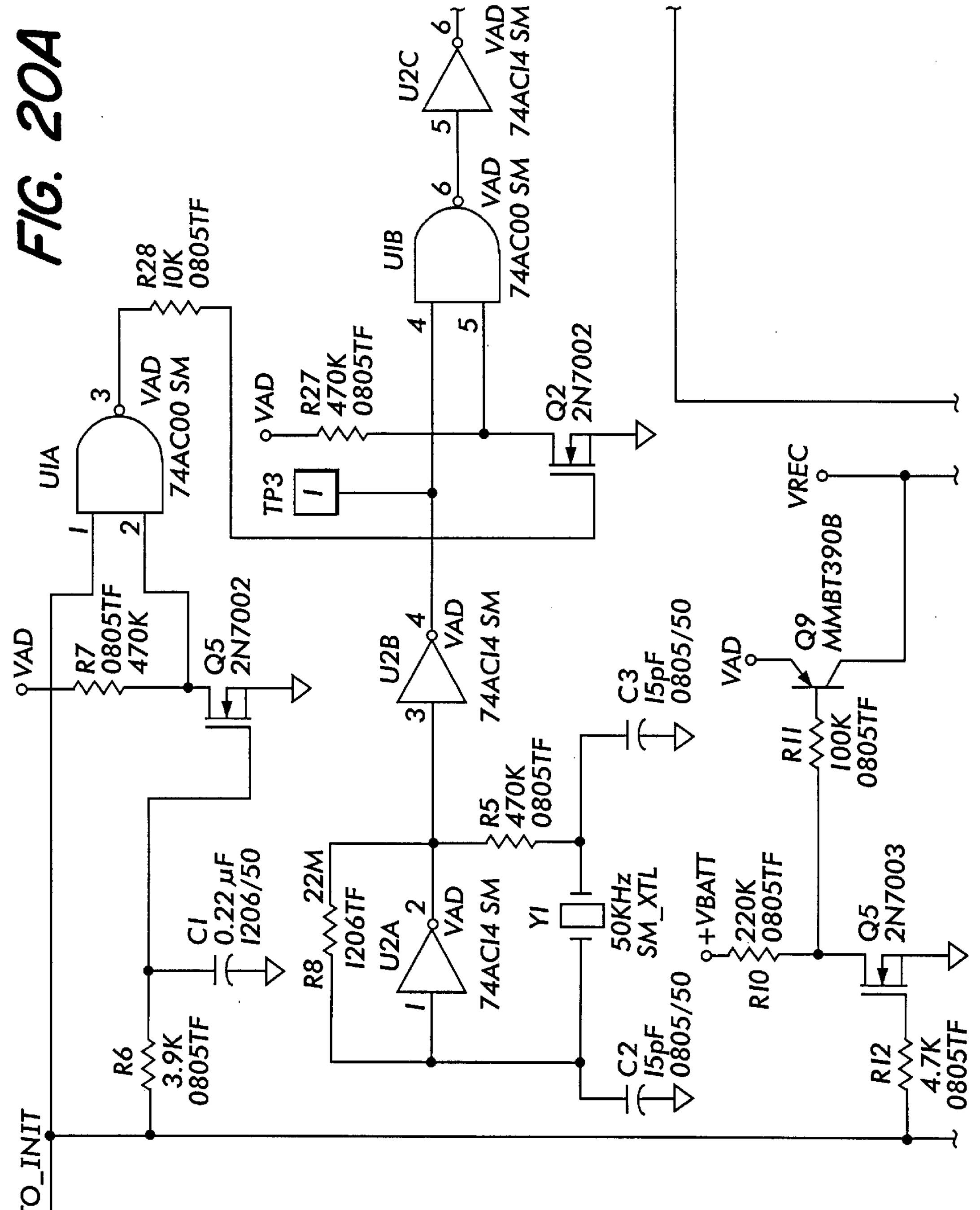
FIG. 20A–20D constitute an electrical schematic diagram of the auto detector.
Figure 19:
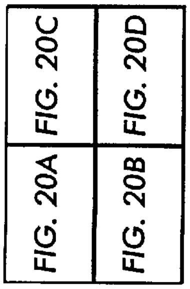
FIG. 19 is a figure layout for FIGS. 20A–20D.
Figure 20B:
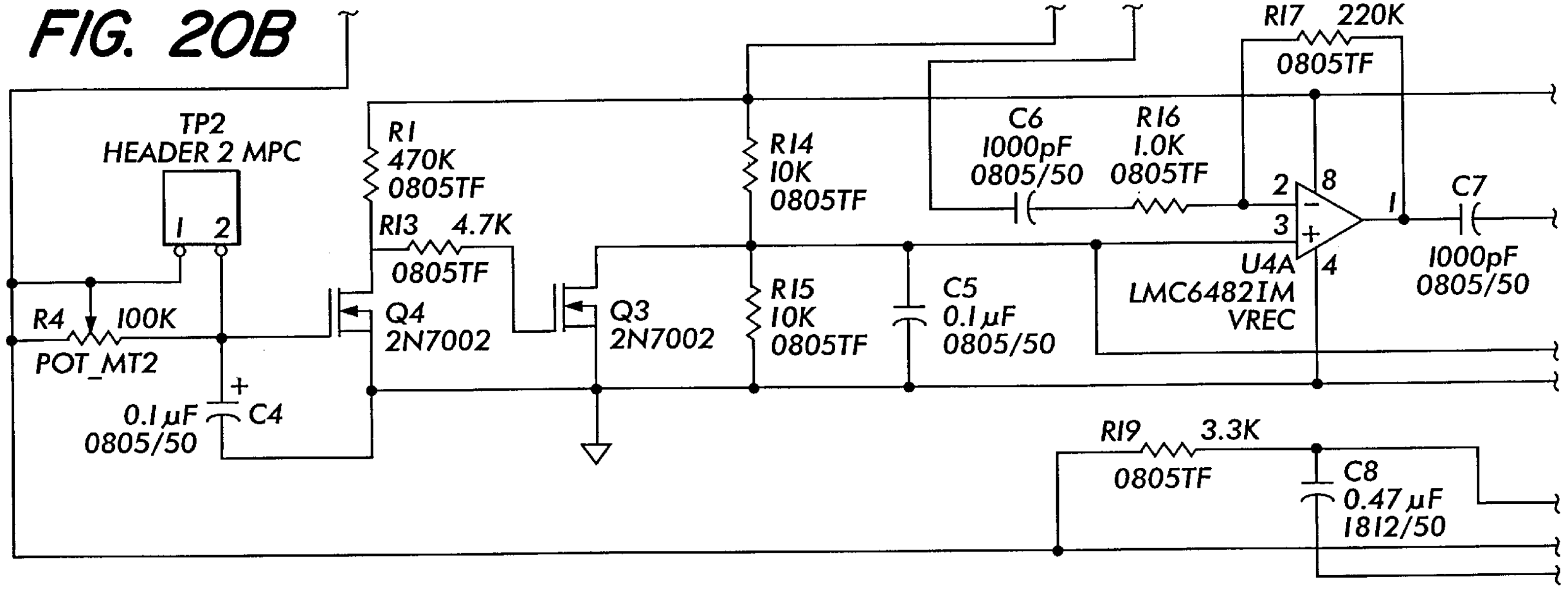
Figure 20B:
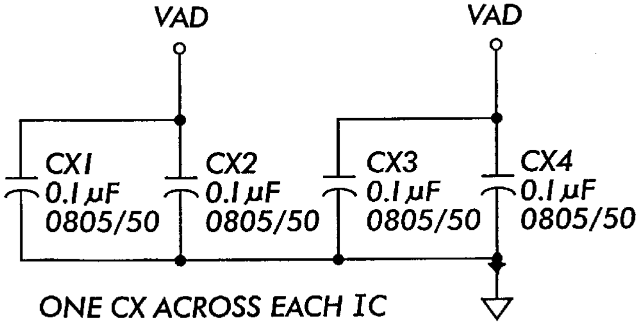
Figure 20C:
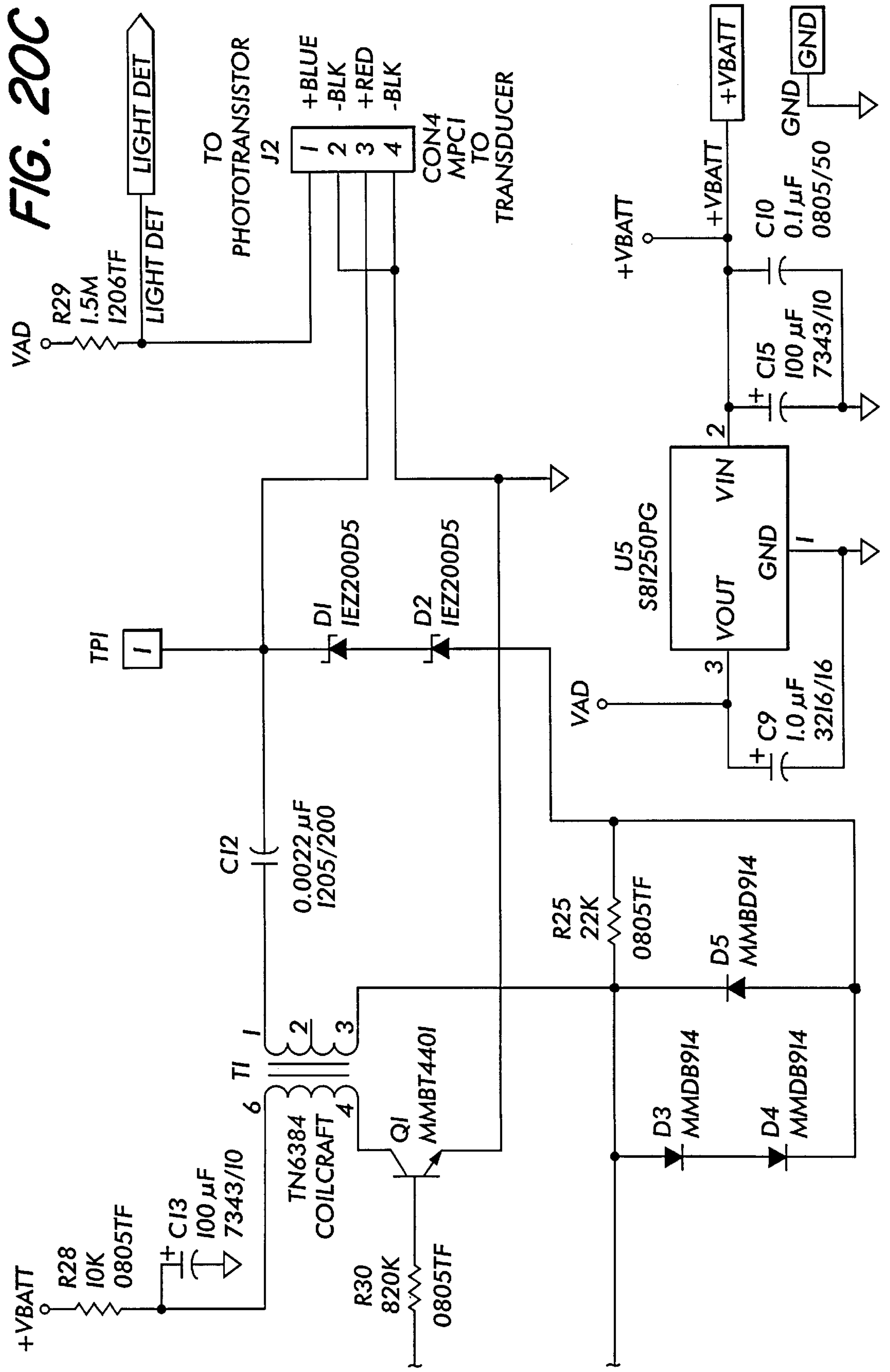
Figure 20D:
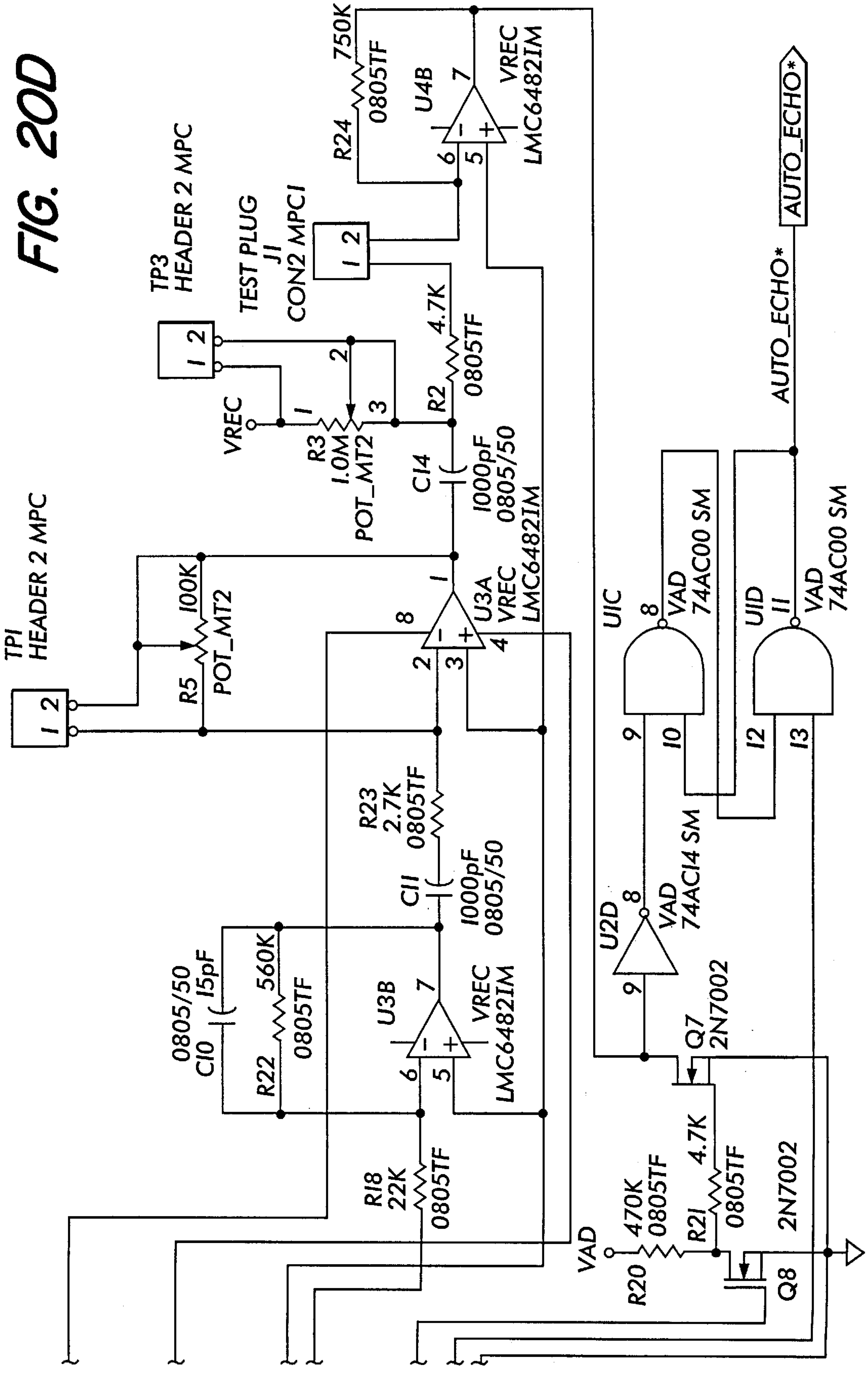

As shown in FIG. 16, the electronics comprise an auto detector 62, a microprocessor 64 (e.g., a Microchip PIC16C74-S4-IL) and an RF transceiver 66. The wire harness 70 comprises four conductors for coupling the auto detector 62 to the transducer assembly 74. The wire harness 72 comprises four conductors for coupling the auto detector 62, the microprocessor 64 and the RF transceiver 66 to the electronic parking meter 22. As can be seen, power (+VBATT) and ground (GND) are provided to the electronics of the PCB 60 from the electronic parking meter 22, as well as supporting the RS-232 link. As such, there must be some provision in the electronic parking meter 22 to permit coupling of the wire harness 72 to the appropriate electronics of the electronic parking meter 22.

The circuitry of the auto detector 62 (FIGS. 20A–20D) operates in accordance with the auto detector 266 of application Ser. No. 08/684,368 and, as such, is not repeated here. It should be noted that the term "auto" detector can be more generally referred to as a "vehicle" detector.

As shown in FIGS. 18A–18E, the microprocessor 64 can be implemented using a Micro Chip PIC16C74 Microcontroller (FIG. 18D), which has 4K words of internal program ROM and 192 bytes of internal RAM. In addition, the microcontroller has three parallel eight bit I/O ports, any or all of which could be interrupt inputs.

The temperature sensor U10 (FIG. 18A) together with diodes D6 and D7 and resistor R40 are used by the microprocessor 64 to determine the temperature in the adaptor 20 (120 or 220) in order to adjust any parameters that are sensitive to changes in temperature. U11A and resistors R36 and R37 are used by the microprocessor 64, as a reference, to determine the power level and report when the power level falls below a predetermined level.

There are two crystals, Y2 and Y3, attached to the microprocessor 64. The 4.00 MHz crystal Y2 (FIG. 18C) is used as the base oscillator when the microprocessor 64 is awake, and the 32.768 kHz crystal Y3 (FIG. 18B) is used when the microprocessor 64 is asleep.

To reduce the number of signal lines coupled to the microprocessor 64, a multiplexor 68 (e.g., CD40528CM, multiplex chip U9, FIG. 18B) is coupled to the microprocessor 64.

Figure 21:
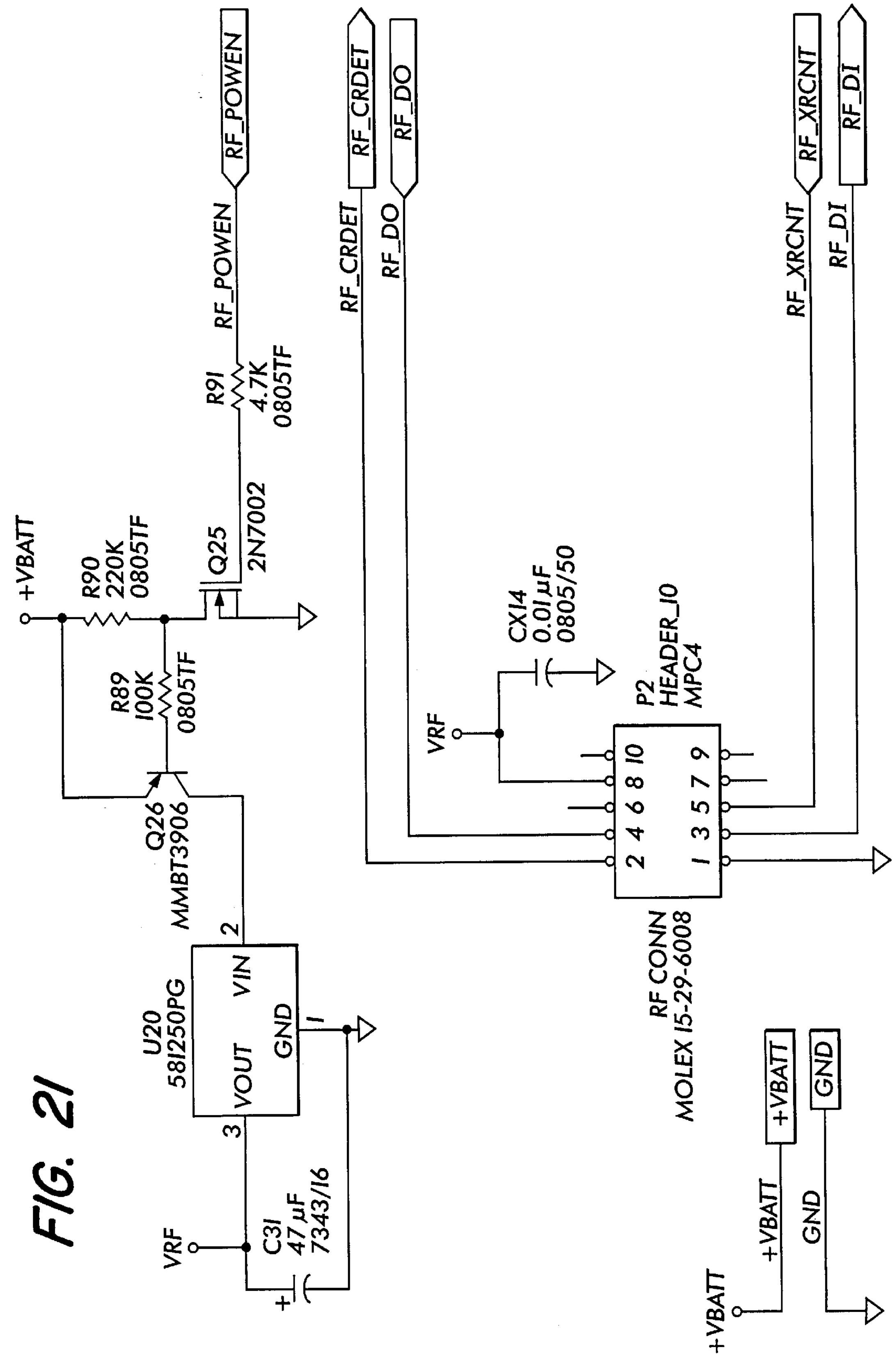
FIG. 21 is an electrical schematic of the RF transceiver.

The RF transceiver 66 is shown in FIG. 21. The RF transceiver 66 is used to alert the parking authority when a vehicle is parked at a meter 22 and the time has expired. It is also able to transmit statistical and maintenance data about the meter 22 to the parking authority. The parking authority can program the universal adaptor 20 (120 or 220) through the RF transceiver 66. Data received by the RF receiver is used to switch power on to the RF transceiver 66 in the same way that the IR transceiver 272 of application Ser. No. 08/684,368 powers itself up.

Data received by the RF receiver is sent to the microprocessor 64, through the RF connector P2 (FIG. 21), then through the multiplexor 68 pin 2 (FIG. 18B), as RF_DI. Transmit data from the microprocessor 64 is sent out of the multiplexor 68 pin 15 as RF_DO. The RF_DO signal is sent to pin 4 of P2 (FIG. 21). Pin 2 (RF_CRDET) and pin 7 of P2 are not used.

There are to be two types of RF transceiver systems used with the universal adaptors 20, 120 and 220 that operate in a frequency band of at least 900 MHz. This is in contradistinction to U.S. Pat. No. 4,356,903 (Lemelson et al.) which discloses a wireless system using shortwave radio.

Figure 22:
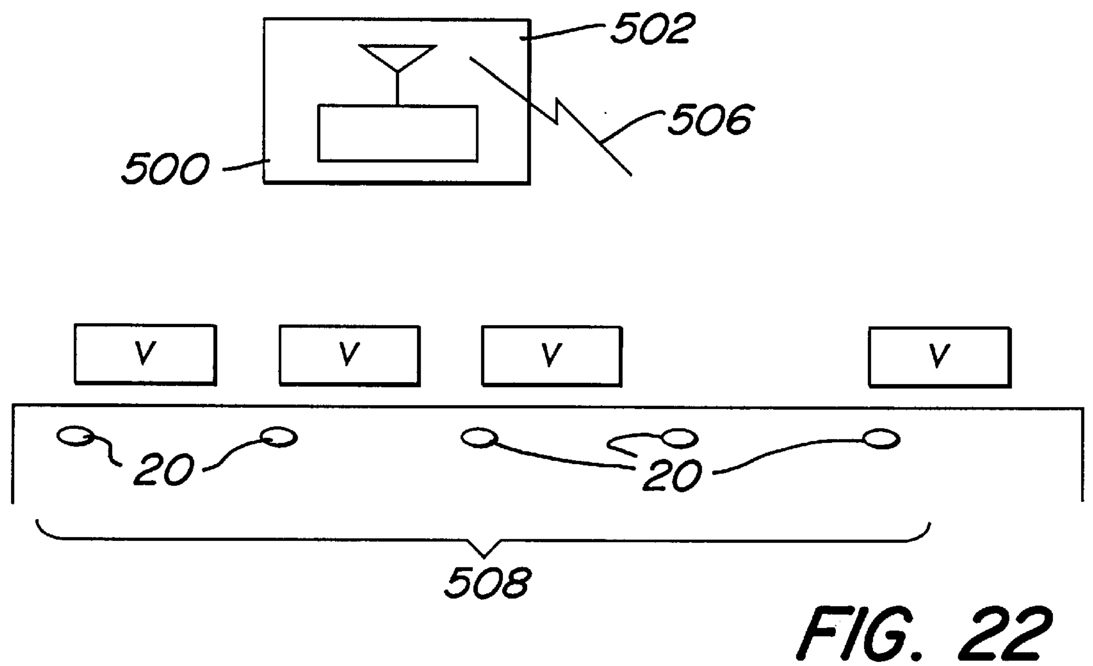
FIG. 22 is a pictorial representation showing the use of a mobile RF transceiver for communicating with a bank of universal adaptors.
Figure 23:
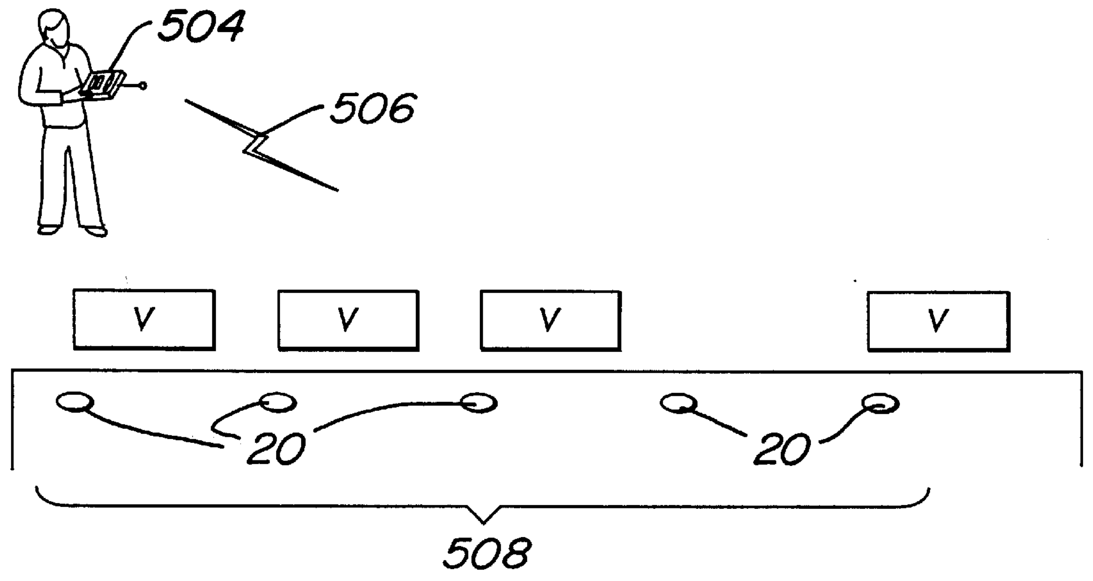
FIG. 23 is a pictorial representation of a parking enforcement officer using a hand-held RF transceiver to interrogate the bank of universal adaptors.

The first system requires a mobile RF transceiver 500 that is either located in a roaming vehicle 502 (FIG. 22) or is part of a hand-held unit 504 (FIG. 23). In either case, the RF transceiver 500 automatically broadcasts a wake-up signal 506 (e.g., an energy burst from either the transmitted carrier signal of at least 900 MHz or the data contained in the energy burst) to the RF transceivers 66 in a bank 508 of electronic parking meters 22 utilizing the universal adaptors 20 (120 or 220), e.g., one street block, to transmit their respective parking meter data/status (e.g., time has expired with a vehicle parked in the corresponding parking space), if any, to the mobile RF transceiver 500 or 504. Each RF transceiver 66 in the adaptor 20 (120 or 220) responds by transmitting its corresponding parking meter 22 data/status subject to a random delay that prevents transmission collisions due to the other adaptors 20 (120 or 220) transmitting.

Should a collision still occur, one of the adaptors' 20 (120 or 220) RF transceivers 66 would back off and try again after another random delay. The mobile RF transceiver 500 or 504 also comprises a computer (not shown) so that once the adaptors' 20 (120 or 220) corresponding parking meter 22 data/status is received by the mobile RF transceiver 500 or 504, that data is loaded into the computer. In particular, the computer in the RF transceiver 500 may comprise a conventional hard drive/monitor computer for storing the parking data/status of an entire region of a city; on the other hand, the computer in the hand-held RF transceiver 504 may comprise enough memory to store the parking meter data/status for the number of meters on the parking authority agent's beat. In either case, the data stored in the respective computers would be brought to parking authority headquarters and then be downloaded into a central database.

Once the current data/status is received and acknowledged by the mobile RF transceiver 500 or 504, the RF transceiver 66 in the adaptor 20 (120 or 220) remains silent until another wake-up signal 506 is received by the adaptor 20 (120 or 220) and new parking meter 22 data/status arise. In addition, once the mobile RF transceiver 500 or 504 has collected the parking meter 22 data/status, the appropriate action is taken by the parking authority, e.g., if a parking violation has occurred a parking authority agent is contacted to issue a ticket accordingly, or if a jam has occurred, a maintenance crew is called. Hereinafter, this is referred to as broadcast communication since the mobile RF transceiver 500 or 504 is requiring that all of the RF transceivers 66 transmit their respective data.

Another variation of this first system is that the mobile RF transceiver 500 or 504 can communicate with an individual electronic parking meter 22 utilizing the universal adaptor 20 (120 or 220), thereby creating an individual communication. In particular, the wake-up signal 506 may contain a specific adaptor serial number, i.e., once all of the RF transceivers 66 in the adaptors 20 (120 or 220) in the bank 508 are awake, only the RF transceiver 66 whose serial number is embedded in the wake-up signal 506 remains in communication with the mobile RF transceiver 500 or 504; all the other RF transceivers 66 remain silent. Also in this variation, each of the RF transceivers 66 comprise a data receiver (not shown) for receiving data from the mobile RF transceiver 500 or 504, rather than just transmitting data to the mobile RF transceiver 500 or 504; the received data can be used by the microprocessor 64 to program the electronic parking meter 22.

Both the broadcast and individual communication using the mobile RF transceiver 500 or 504 can be implemented in the following exemplary manner. When the wake-up signal 506 is received by the RF transceiver 66, the RF_CRDET (carrier detect) signal alerts the microprocessor 64 which in turn powers up the RF transceiver 66 with the RF_POWEN signal. The serial number in the wake-up signal 506 is then transmitted to the microprocessor 64 on the RF_DI signal. If the microprocessor 64 determines that the serial number in the wake-up signal 506 corresponds to its serial number, the microprocessor 64 begins transferring its data to its RF transceiver 66. If the microprocessor 64 does not recognize the serial number in the wake-up signal 506, the microprocessor 64 deactivates its respective RF transceiver 66. Hence, an individual communication is established. Alternatively, the serial number in the wake-up signal 506 may be a specially-assigned number that every microprocessor 64 recognizes and, as such, the RF transceivers 66 in all of the adaptors 20 (120 or 220) begin transmitting their parking meter data/status. Hence, a broadcast communication is established.

Figure 24:
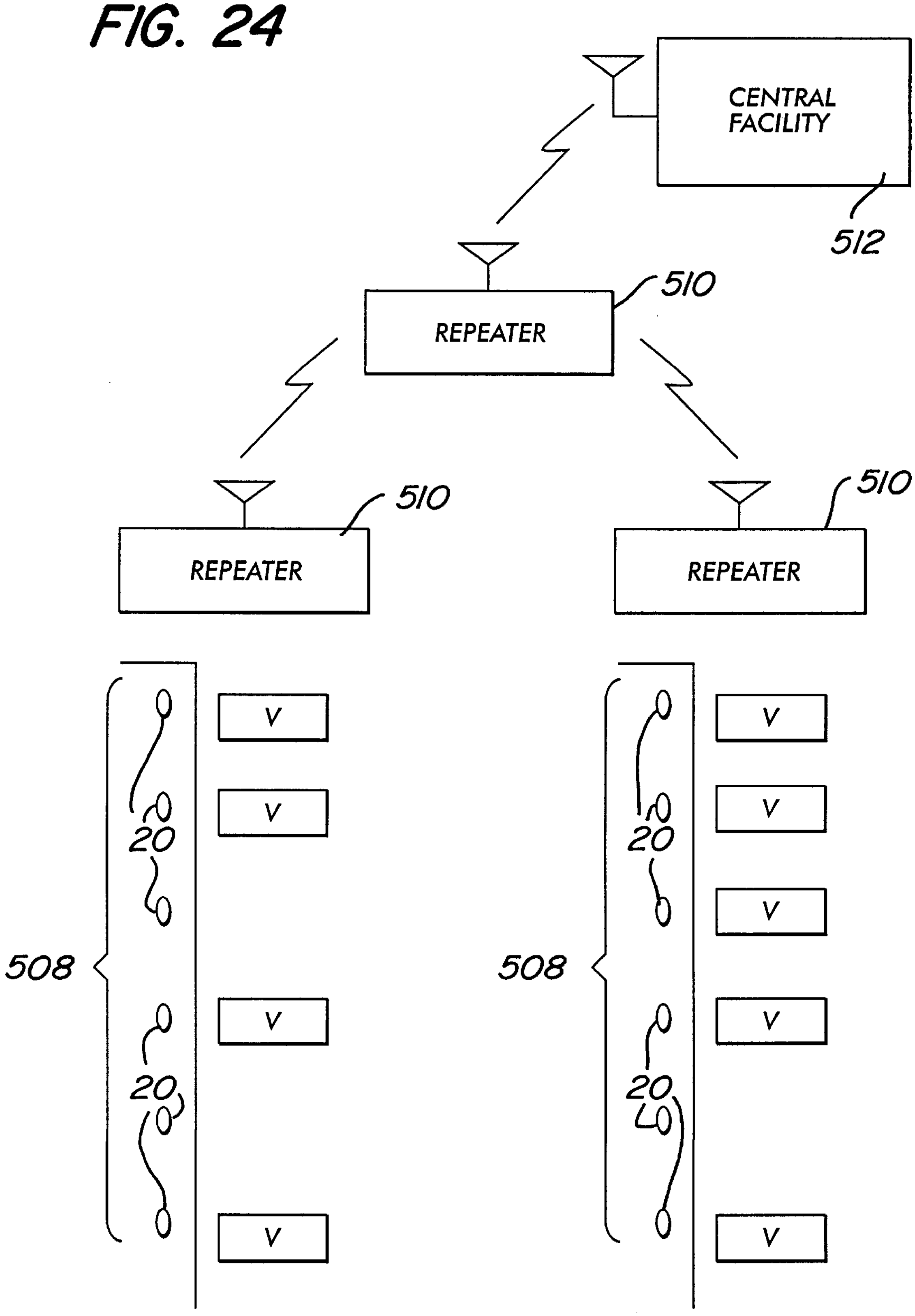
FIG. 24 is a pictorial representation of a RF communication system between the universal adaptors and a central facility.

A second RF transceiver system (FIG. 24) would not require a mobile RF transceiver 500 or 504, but would require that the town utilize a network with RF repeaters 510 at specific corners. Each repeater 510 would interrogate a predetermined set of adaptors 20 (120 or 220), e.g., a bank 508 of electronic parking meters 22 utilizing the universal adaptors 20 (120 or 220), and transmit their corresponding parking meter 22 data to headquarters or central facility 512. This would allow the parking authority to get immediate information on each meter 22 and allow them to make more efficient use of their parking enforcement officers and maintenance personnel. As an example of the communication system to be used with the RF transceiver 66, a CellNet communications network can be used with the RF transceiver 66; the CellNet operates in the 952/928 MHz frequency range.

As such, with either the first system (FIGS. 22–23) or the second system (FIG. 24) described above, the wireless transmission of parking meter data/status allows transmission to either a central point 512 or to a mobile unit (500 or 504) for the purpose of communicating parking activity and revenue information on a daily, weekly, monthly basis for individual parking meters 22, such as, but not limited to:

- parked car count
- accumulated parked time
- average park time
- empty space count
- accumulated empty time
- average empty time
- paid car count
- accumulated paid time
- average paid time
- reset car count
- accumulated reset time
- average reset time
- grace period count
- accumulated grace time
- average grace time
- expired time count
- accumulated expired time
- average expired time
- slug count
- extended time attempts (the number of coins deposited in a failed attempt to purchase more time than the preset maximum)
- expired meter
- low battery
- jammed
- cash total
- maximum coin capacity
- sensor broken.

From all of this data, once received and correlated, the parking authority can then generate reports to all departments. With these reports, each department is better able to control cost and schedule personnel. For example, hard copy reports can be generated from the data provided by the universal adaptors 20 (120 or 220) including:

- revenue by day & day of week (revenue=cash, tokens, debit cards, separately)
- cash in meter (coins & tokens)
- activity by daypart & day of week count & time space occupied (active & inactive separately)

count & time space empty (active & inactive separately)

count & time purchased (active & inactive separately)

count & time reset upon vehicle departure count & time reset repurchased count & time not reset reused count & time in grace periods (arrival & expiration separately)

count & time expired longest expired time by day, time stamped (at beginning or end of expiration)

low battery warning flag count of unrecognized coins/tokens inserted count of valid/invalid coins/tokens in an attempt to feed meter count of valid/invalid coins/tokens inserted by hour (last 24 only)

count of coins/tokens inserted in an attempt to feed the meter by hour (last 24 only)

all revenue data will be in 3 byte fields all count data will be in two byte fields time data will be two byte hours, one byte minutes, one byte seconds.

It should be noted that the adaptors 20, 120 and 220 may be used in conjunction with typical hand-held IR transceivers for programming the electronic parking meters 22. In particular, the parking authority may choose to program individual electronic parking meters 22 with conventional hand-held IR transceivers (not shown) while extracting parking meter 22 data/status via the RF transceiver 66 in the universal adaptor 20 (120 or 220), as discussed earlier. The disadvantage of using the conventional IR transceiver is that it requires the parking authority agent to approach each electronic parking meter 22 individually to properly interrogate that meter's 22 microprocessor.

Alternatively, the parking authority may choose to program the electronic parking meters 22 via RF transmission to the bank 508 of electronic parking meters 22 (e.g., a plurality of electronic parking meters 22 located on one street). In that situation, the RF signal is received by the universal adaptor 20 (120 or 220) of each electronic parking meter 22 in the bank which then uses the RS-232 link to program the microprocessor in the electronic parking meter 22. In this situation, the conventional IR transceiver would only be used for maintenance of a particular electronic parking meter 22.

Without further elaboration, the foregoing will so fully illustrate our invention that others may, by applying current or future knowledge, readily the same for use under various conditions of service.

We claim:

1. An adaptor for coupling an electronic parking meter to a vault on a stanchion at a corresponding curb side parking space, or at a parking lot space, said adaptor comprising:

(a) an enclosure disposed between the vault and the electronic parking meter, said enclosure comprising a closed wall defining an internal passageway for permitting coins to drop therethrough from the electronic parking meter to the vault;

(b) a vehicle detector, inside said enclosure, for detecting the presence of a vehicle in the corresponding curb side parking space or parking lot space, said vehicle detector being in electrical communication with the electronic parking meter; and (c) securement means comprising a plurality of sleeves adapted to receive respective bolts for securing the electronic parking meter and said adaptor to the vault by parking authority personnel only.

2. The adaptor of claim 1 wherein said vehicle detector comprises a sonar transducer disposed in said closed wall for emitting sonar signals and for receiving sonar signals.

3. The adaptor of claim 2 wherein said vehicle detector further comprises electronics coupled to said sonar transducer for controlling the emission of sonar signals and for processing said received sonar signals.

4. The adaptor of claim 3 wherein said electronics further comprise a microprocessor coupled to said sonar transducer for determining a distance between the electronic parking meter and a target in the vicinity of the parking space from said received sonar signals.

5. The adaptor of claim 4 wherein said distance between the meter and the target is determined by said microprocessor to be in a too-close range, in a valid vehicle range or in a too-far range, said target being considered a vehicle whenever said determined distance falls within said valid vehicle range.

6. The adaptor of claim 5 wherein said valid vehicle range is adjustable by parking authority personnel.

7. The adaptor of claim 6 wherein said microprocessor comprises means for debouncing said received sonar signals whenever said determined distance changes from one of said ranges to another.

8. The adaptor of claim 7 wherein said debouncing means includes a respective debounce count for each of said ranges, each of said debounce counts being adjustable by parking authority personnel.

9. The adaptor of claim 8 wherein said vehicle detector further comprises a phototransistor disposed closely adjacent said sonar transducer, said phototransistor detecting a brightness level adjacent said meter.

10. The adaptor of claim 9 wherein said phototransistor is coupled to said microprocessor, said microprocessor using said brightness level to determine whether said sonar transducer is being blocked whenever said determined distance is within said too close range.

11. The adaptor of claim 10 wherein said microprocessor energizes and de-energizes said vehicle detector.

12. The adaptor of claim 4 wherein said electronics further comprises an internal RF transceiver coupled to said microprocessor, said internal RF transceiver transmitting parking meter data to an external RF transceiver and said microprocessor providing said internal RF transceiver with said parking meter data for transmission.

13. The adaptor of claim 12 wherein said internal RF transceiver is powered up only when energy is received from said external RF transceiver.

14. The adaptor of claim 13 wherein said external RF transceiver provides data to said internal RF transceiver for use by said microprocessor in programming the electronic parking meter.

15. The adaptor of claim 14 wherein said external RF transceiver comprises a plurality of RF repeaters that are in RF communication with a central facility.

16. The adaptor of claim 14 wherein said external RF transceiver is mobile and wherein said internal RF transceiver transmits parking meter data to said external mobile RF transceiver when requested by said external mobile RF transceiver and said microprocessor provides said internal RF transceiver with said parking meter data.

17. The adaptor of claim 16 wherein said internal RF transceiver is powered up only when energy is received from said external mobile RF transceiver.

18. The adaptor of claim 17 wherein said external mobile RF transmitter provides data to said internal RF transceiver for use by said microprocessor in programming the electronic parking meter.

19. The adaptor of claim 15 wherein said internal RF transceiver operates in a frequency band of at least 900 MHz to transmit said parking meter data.

20. The adaptor of claim 16 wherein said internal RF transceiver operates in a frequency band of at least 900 MHz to transmit said parking meter data.

21. The adaptor of claim 2 wherein said enclosure comprises a plurality of facet surfaces and wherein said sonar transducer is mounted in one of said facet surfaces.

22. The adaptor of claim 2 wherein said enclosure comprises three facet surfaces.

23. The adaptor of claim 21 wherein said vehicle detector further comprises electronics coupled to said sonar transducer for controlling the emission of sonar signals and for processing said received sonar signals.

24. The adaptor of claim 23 wherein said electronics further comprise a microprocessor coupled to said sonar transducer for determining a distance between the electronic parking meter and a target in the vicinity of the parking space from said received sonar signals.

25. The adaptor of claim 24 wherein said distance between the meter and the target is determined by said microprocessor to be in a too-close range, in a valid vehicle range or in a too-far range, said target being considered a vehicle whenever said determined distance falls within said valid vehicle range.

26. The adaptor of claim 25 wherein said valid vehicle range is adjustable by parking authority personnel.

27. The adaptor of claim 26 wherein said microprocessor comprises means for debouncing said received sonar signals whenever said determined distance changes from one of said ranges to another.

28. The adaptor of claim 27 wherein said debouncing means includes a respective debounce count for each of said ranges, each of said debounce counts being adjustable by parking authority personnel.

29. The adaptor of claim 28 wherein said vehicle detector further comprises a phototransistor disposed closely adjacent said sonar transducer, said phototransistor detecting a brightness level adjacent said meter.

30. The adaptor of claim 29 wherein said phototransistor is coupled to said microprocessor, said microprocessor using said brightness level to determine whether said sonar transducer is being blocked whenever said determined distance is within said too close range.

31. The adaptor of claim 30 wherein said microprocessor energizes and de-energizes said vehicle detector.

32. The adaptor of claim 31 wherein said electronics further comprises an internal RF transceiver coupled to said microprocessor, said internal RF transceiver transmitting parking meter data to an external RF transceiver and said microprocessor providing said internal RF transceiver with said parking meter data for transmission.

33. The adaptor of claim 32 wherein said internal RF transceiver is powered up only when energy is received from said external RF transceiver.

34. The adaptor of claim 33 wherein said external RF transceiver provides data to said internal RF transceiver for use by said microprocessor in programming the electronic parking meter.

35. The adaptor of claim 34 wherein said external RF transceiver comprises a plurality of RF repeaters that are in RF communication with a central facility.

36. The adaptor of claim 34 wherein said external RF transceiver is mobile and wherein said internal RF transceiver transmits parking meter data to said external mobile RF transceiver when requested by said external mobile RF transceiver and said microprocessor provides said internal RF transceiver with said parking meter data.

37. The adaptor of claim 36 wherein said internal RF transceiver is powered up only when energy is received from said external mobile RF transceiver.

38. The adaptor of claim 37 wherein said external mobile RF transmitter provides data to said internal RF transceiver for use by said microprocessor in programming the electronic parking meter.

39. The adaptor of claim 35 wherein said internal RF transceiver operates in a frequency band of at least 900 MHz to transmit said parking meter data.

40. The adaptor of claim 36 wherein said internal RF transceiver operates in a frequency band of at least 900 MHz to transmit said parking meter data.

41. The adaptor of claim 1 wherein said enclosure comprises outer and inner concentric surfaces whereby said outer surface is in sliding engagement with said inner surface, said vehicle detector being mounted in said outer concentric surface and disposed in a slot in said inner concentric surface to permit said vehicle detector to be positioned at a desired angular orientation about a vertical axis of said adaptor.

42. The adaptor of claim 41 wherein said vehicle detector comprises a sonar transducer disposed in said closed wall for emitting sonar signals and for receiving sonar signals, and wherein said enclosure comprises a second securement means for locking said sonar transducer at said desired angular orientation.

43. The adaptor of claim 42 wherein said vehicle detector further comprises electronics coupled to said sonar transducer for controlling the emission of sonar signals and for processing said received sonar signals.

44. The adaptor of claim 43 wherein said electronics further comprise a microprocessor coupled to said sonar transducer for determining a distance between the electronic parking meter and a target in the vicinity of the parking space from said received sonar signals.

45. The adaptor of claim 44 wherein said distance between the meter and the target is determined by said microprocessor to be in a too-close range, in a valid vehicle range or in a too-far range, said target being considered a vehicle whenever said determined distance falls within said valid vehicle range.

46. The adaptor of claim 45 wherein said valid vehicle range is adjustable by parking authority personnel.

47. The adaptor of claim 46 wherein said microprocessor comprises means for debouncing said received sonar signals whenever said determined distance changes from one of said ranges to another.

48. The adaptor of claim 47 wherein said debouncing means includes a respective debounce count for each of said ranges, each of said debounce counts being adjustable by parking authority personnel.

49. The adaptor of claim 48 wherein said vehicle detector further comprises a phototransistor disposed closely adjacent said sonar transducer, said phototransistor detecting a brightness level adjacent said meter.

50. The adaptor of claim 49 wherein said phototransistor is coupled to said microprocessor, said microprocessor using said brightness level to determine whether said sonar transducer is being blocked whenever said determined distance is within said too close range.

51. The adaptor of claim 50 wherein said microprocessor energizes and de-energizes said vehicle detector.

52. The adaptor of claim 51 wherein said electronics further comprises an internal RF transceiver coupled to said microprocessor, said internal RF transceiver transmitting parking meter data to an external RF transceiver and said microprocessor providing said internal RF transceiver with said parking meter data for transmission.

53. The adaptor of claim 52 wherein said internal RF transceiver is powered up only when energy is received from said external RF transceiver.

54. The adaptor of claim 53 wherein said external RF transceiver provides data to said internal RF transceiver for use by said microprocessor in programming the electronic parking meter.

55. The adaptor of claim 54 wherein said external RF transceiver comprises a plurality of RF repeaters that are in RF communication with a central facility.

56. The adaptor of claim 54 wherein said external RF transceiver is mobile and wherein said internal RF transceiver transmits parking meter data to said external mobile RF transceiver when requested by said external mobile RF transceiver and said microprocessor provides said internal RF transceiver with said parking meter data.

57. The adaptor of claim 56 wherein said internal RF transceiver is powered up only when energy is received from said external mobile RF transceiver.

58. The adaptor of claim 57 wherein said external mobile RF transmitter provides data to said internal RF transceiver for use by said microprocessor in programming the electronic parking meter.

59. The adaptor of claim 55 wherein said internal RF transceiver operates in a frequency band of at least 900 MHz to transmit said parking meter data.

60. The adaptor of claim 56 wherein said internal RF transceiver operates in a frequency band of at least 900 MHz to transmit said parking meter data.

61. The adaptor of claim 2 further comprising a rotation device for permitting an adjustable rotation of the electronic parking meter, about a vertical axis, said rotation device comprising:

(a) a vault cover plate having a top periphery containing a plurality of countersunk receiving channels for receiving bolts that secure said vault cover plate to the vault;

(b) a rotator adaptor comprising a flat upper surface for supporting said enclosure, a conical-shaped midsection and a cylindrical bottom portion having an outer wall that includes an annular collar and a threaded portion just below said annular collar, said cylindrical bottom portion projecting through a hole in said cover plate adjacent the plurality of holes, said flat upper surface, said conical-shaped midsection and said cylindrical bottom having respective open interiors for further defining said passageway for a deposited coin to pass from the electronic parking meter to the vault;

(c) a tamper proof member disposed on top of said countersunk receiving channels to conceal said receiving bolts; and (d) a rotator adaptor ring for engaging said threaded portion and for releasably securing the electronic parking meter in a desired orientation about said vertical axis and for securing said tamper proof member between said annular collar and said countersunk receiving channels.

62. The adaptor of claim 1 wherein said vehicle detector further comprises a microprocessor, said microprocessor including means for determining a parked vehicle count based on vehicles parked at the curb side parking space or at the parking lot space.

63. The adaptor of claim 62 wherein said microprocessor includes means for determining an accumulated parked time.

64. The adaptor of claim 63 wherein said microprocessor includes means for determining an average park time.

65. The adaptor of claim 1 wherein said vehicle detector further comprises a microprocessor, said microprocessor including means for determining an empty parking space count based on vehicles parked at the curb side parking space or at the parking lot space.

66. The adaptor of claim 65 wherein said microprocessor includes means for determining an accumulated empty parking space time.

67. The adaptor of claim 66 wherein said microprocessor includes means for determining an average empty parking space time.

68. The adaptor of claim 1 wherein said vehicle detector further comprises a microprocessor, said microprocessor including means for determining a paid vehicle count based on vehicles parked at the curb side parking space or at the parking lot space.

69. The adaptor of claim 68 wherein said microprocessor includes means for determining an accumulated paid time.

70. The adaptor of claim 69 wherein said microprocessor includes means for determining an average paid time.

71. The adaptor of claim 1 wherein said vehicle detector further comprises a microprocessor and wherein said microprocessor resets said electronic parking meter whenever said detector no longer detects a parked vehicle, said microprocessor including means for determining a reset car count based on vehicles parked at the curb side parking space or at the parking lot space.

72. The adaptor of claim 71 wherein said microprocessor includes means for determining an accumulated reset time of said meter.

73. The adaptor of claim 72 wherein said microprocessor includes means for determining an average reset time of said meter.

74. The adaptor of claim 1 wherein said vehicle detector further comprises a microprocessor, said microprocessor including means for determining said meter has expired.

75. The adaptor of claim 74 wherein said means for determining said meter has expired is coupled to means for indicating an expired meter condition, said microprocessor deactivating said indicating means for a certain period of time with no purchased time on said meter and with a vehicle being parked in the curb side parking space or at the parking lot space, said certain period of time defining a grace period, said microprocessor including means for determining a grace period count of said meter based on vehicles parked at the curb side parking space or at the parking lot space.

76. The adaptor of claim 75 wherein said microprocessor includes means for determining an accumulated grace time of said meter.

77. The adaptor of claim 76 wherein said microprocessor includes means for determining an average grace time of said meter.

78. The adaptor of claim 74 wherein said microprocessor includes means for determining an expired time count of said meter based on vehicles parked at the curb side parking space or at the parking lot space.

79. The adaptor of claim 78 wherein said microprocessor includes means for determining an accumulated expired time of said meter.

80. The adaptor of claim 79 wherein said microprocessor includes means for determining an average expired time of said meter.

81. The adaptor of claim 1 wherein said vehicle detector further comprises a microprocessor, said microprocessor including means for determining a slug count of slugs inserted into said meter.

82. The adaptor of claim 1 wherein said vehicle detector further comprises a microprocessor, said microprocessor including means for determining extended time attempts by a patron to purchase more time on said meter.

83. The adaptor of claim 1 wherein said vehicle detector further comprises a microprocessor, said microprocessor including means for determining cash total in said meter.

84. The adaptor of claim 1 wherein said vehicle detector further comprises a microprocessor, said microprocessor including means for determining maximum coin capacity in said meter.

85. The adaptor of claim 1 wherein said vehicle detector further comprises a microprocessor and wherein said meter is powered by batteries, said microprocessor including means for determining a low battery condition of said electronic meter.

86. The adaptor of claim 1 wherein said vehicle detector further comprises a microprocessor, said microprocessor including means for determining said meter is jammed.

87. The adaptor of claim 2 wherein said vehicle detector further comprises a microprocessor, said microprocessor including means for determining that said sonar transducer is broken.

88. The adaptor of claim 1 wherein said vehicle detector further comprises a microprocessor, said microprocessor including means for determining revenue of said meter per day.

89. The adaptor of claim 88 wherein said means for determining revenue of said meter determines revenue according to the day of the week.

90. The adaptor of claim 1 wherein said vehicle detector further comprises a microprocessor, said microprocessor including means for tracking how often and when the parking space or parking lot space has been occupied or empty based on vehicles parked at the curb side parking space or at the parking lot space.

91. The adaptor of claim 1 wherein said vehicle detector further comprises a microprocessor, said microprocessor including means for tracking how often and when time has been purchased on said meter.

92. The adaptor of claim 71 wherein said microprocessor includes means for tracking how often and when said meter has been reset upon departures of vehicles from the parking space or parking lot space.

93. The adaptor of claim 71 wherein said microprocessor includes means for tracking how often and when a first vehicle departs with a certain amount of purchased time still on said meter, that is subsequently reset thereby defining a reset amount of time, and another patron repurchases time on said meter just after said first vehicle departs and wherein said repurchased time is defined as the amount of time purchased by the another patron that is equal to or less than said reset amount of time.

94. The adaptor of claim 71 wherein said microprocessor includes means for tracking how often and when a new vehicle enters the parking space or parking lot space with time still on said meter.

95. The adaptor of claim 75 wherein said microprocessor includes means for tracking how often and the duration of said grace period on said meter.

96. The adaptor of claim 74 wherein said microprocessor includes means for tracking how often and when said meter becomes expired.

97. The adaptor of claim 96 wherein said microprocessor includes means for tracking a longest expired time on said meter according to day and time.

98. The adaptor of claim 1 wherein said vehicle detector further comprises a microprocessor, said microprocessor including means for tracking unrecognized coins or tokens inserted into said meter.

99. The adaptor of claim 1 wherein said vehicle detector further comprises a microprocessor, said microprocessor including means for tracking how often valid/invalid coins have been fed to said meter.

100. The adaptor of claim 99 wherein said vehicle detector further comprises a microprocessor, said microprocessor including means for tracking by hour how often valid/invalid coins have been fed to said meter.

* * * * *